United States Patent
Ladick et al.

(10) Patent No.: US 12,534,917 B2
(45) Date of Patent: Jan. 27, 2026

(54) MOISTURE DETECTION AND INDICATOR SYSTEM AND METHOD OF USE WHILE MAINTAINING ROOF MEMBRANE INTEGRITY

(71) Applicants: Robert B Ladick, Abbotsford (CA); Steven M Ladick, Abbotsford (CA)

(72) Inventors: Robert B Ladick, Abbotsford (CA); Steven M Ladick, Abbotsford (CA)

(*) Notice: Subject to any disclaimer, the term of this patent is extended or adjusted under 35 U.S.C. 154(b) by 955 days.

(21) Appl. No.: 17/275,884

(22) PCT Filed: Sep. 10, 2019

(86) PCT No.: PCT/CA2019/000129
§ 371 (c)(1),
(2) Date: Mar. 12, 2021

(87) PCT Pub. No.: WO2020/051675
PCT Pub. Date: Mar. 19, 2020

(65) Prior Publication Data
US 2022/0056698 A1 Feb. 24, 2022

Related U.S. Application Data

(60) Provisional application No. 62/730,507, filed on Sep. 12, 2018.

(51) Int. Cl.
*E04D 13/00* (2006.01)
*G01N 27/22* (2006.01)
*G08B 21/20* (2006.01)

(52) U.S. Cl.
CPC ......... *E04D 13/006* (2013.01); *G01N 27/223* (2013.01); *G08B 21/20* (2013.01)

(58) Field of Classification Search
CPC ..... E04D 13/006; G01M 3/042; G01M 3/045; G01N 27/223; G08B 21/20; G08B 25/08; G08B 25/14; H04W 4/33; H04W 4/38
See application file for complete search history.

(56) References Cited

U.S. PATENT DOCUMENTS

| | | | | |
|---|---|---|---|---|
| 4,598,273 A * | 7/1986 | Bryan, Jr. | ............. | E04D 13/006 73/304 R |
| 5,463,377 A * | 10/1995 | Kronberg | ............... | G08B 21/20 340/592 |
| 9,774,136 B2 * | 9/2017 | Szeto | ..................... | H01R 35/04 |
| 2015/0168329 A1 * | 6/2015 | Gunness | ................. | G01M 3/16 324/663 |

* cited by examiner

*Primary Examiner* — Quan Zhen Wang
*Assistant Examiner* — Rajsheed O Black-Childress
(74) *Attorney, Agent, or Firm* — Perpetual Motion Patents

(57) ABSTRACT

A system, method and apparatus for detecting moisture leaks in roofs and for providing a visual alert regarding such leaks, and which does not require puncturing or compromise of the roof membrane, comprises a dual part moisture detection and indicator system which comprises a wicking sensor, a wicking portion, a non-electronic trigger portion below the membrane, which is enabled to receive a non-electronic signal from the wicking portion and a non-electronic indicator portion above the membrane which is enabled to receive a non-electronic signal from the trigger portion and to thereafter produce a notification of a leak.

12 Claims, 7 Drawing Sheets

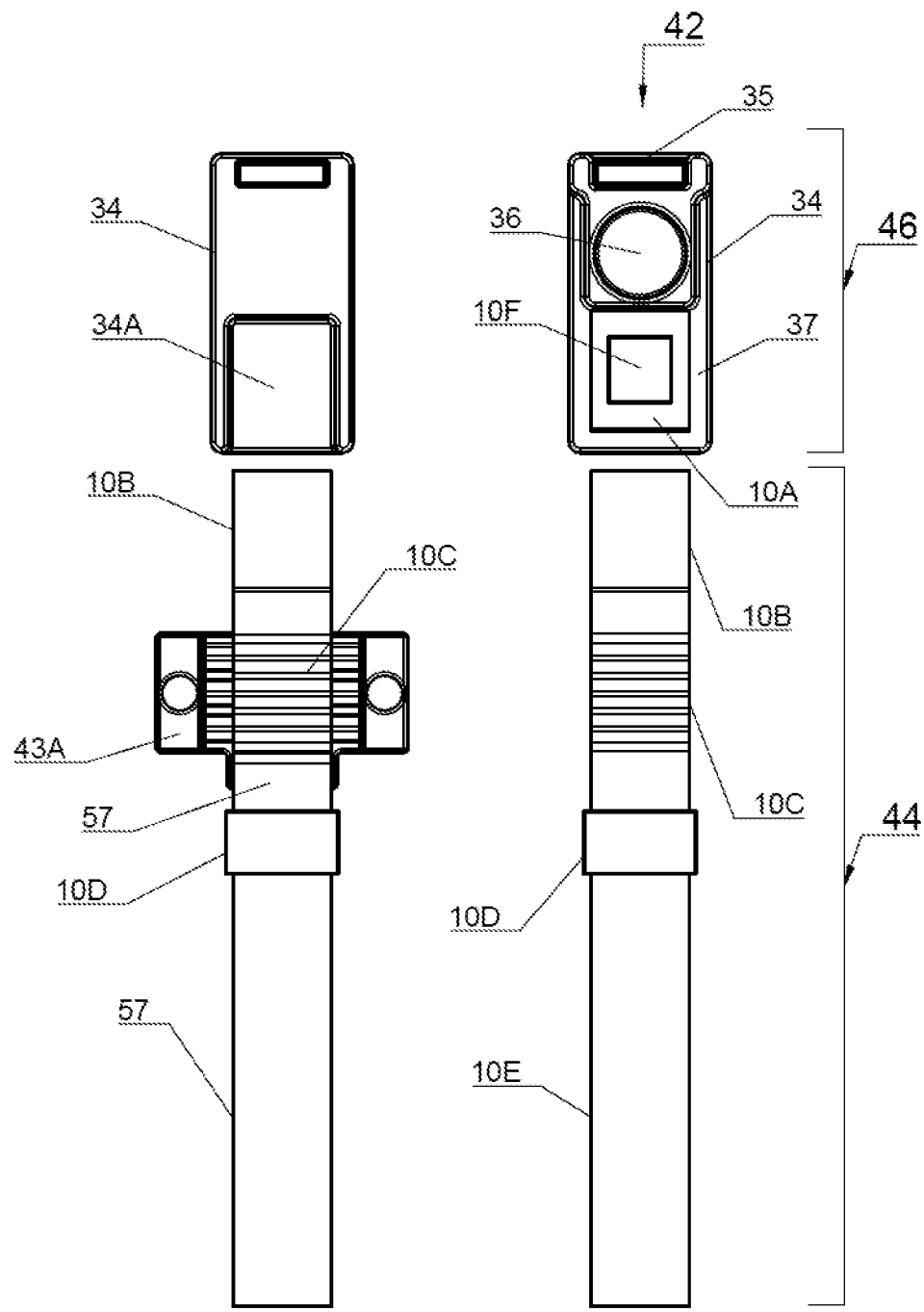

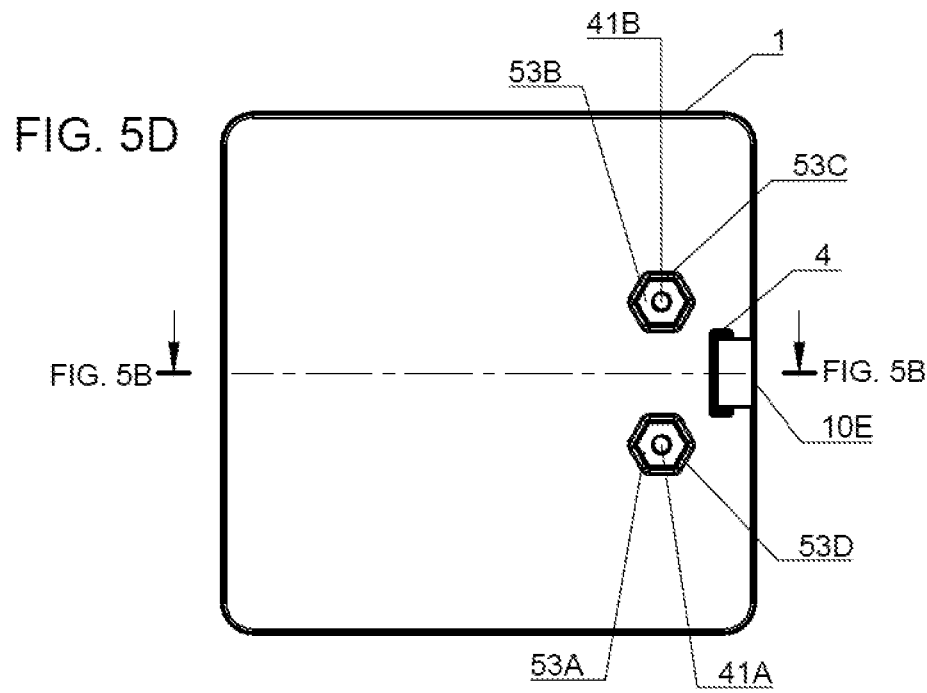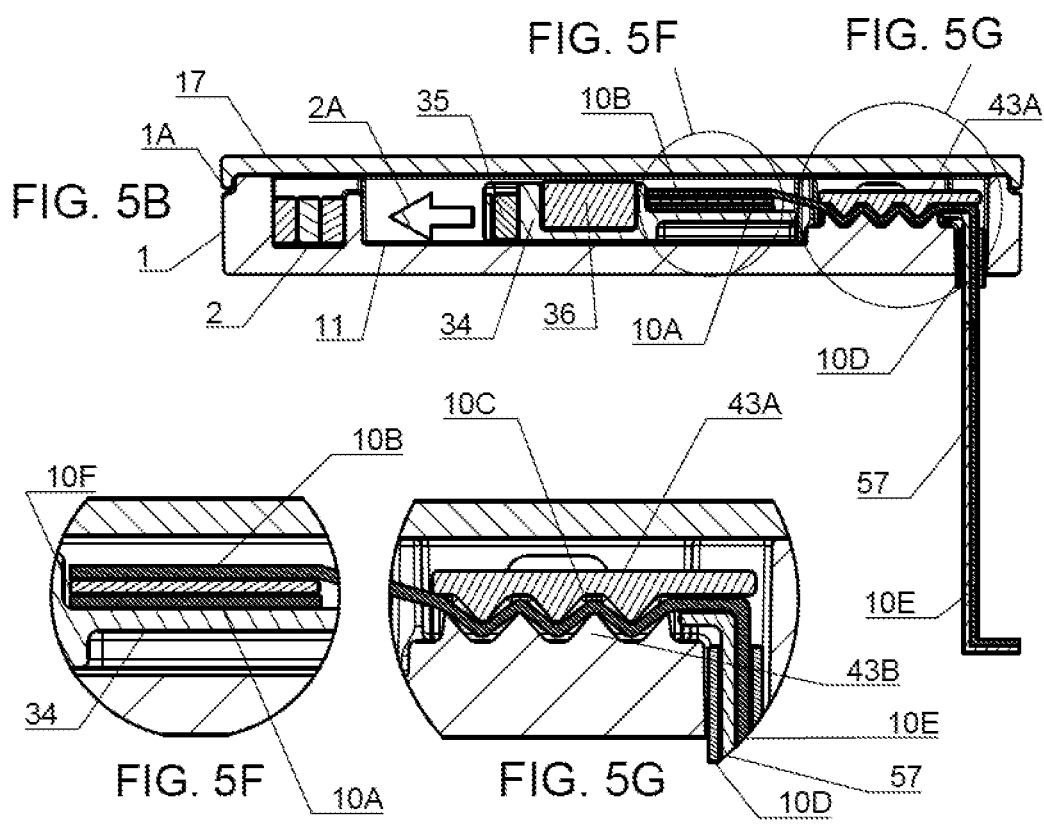

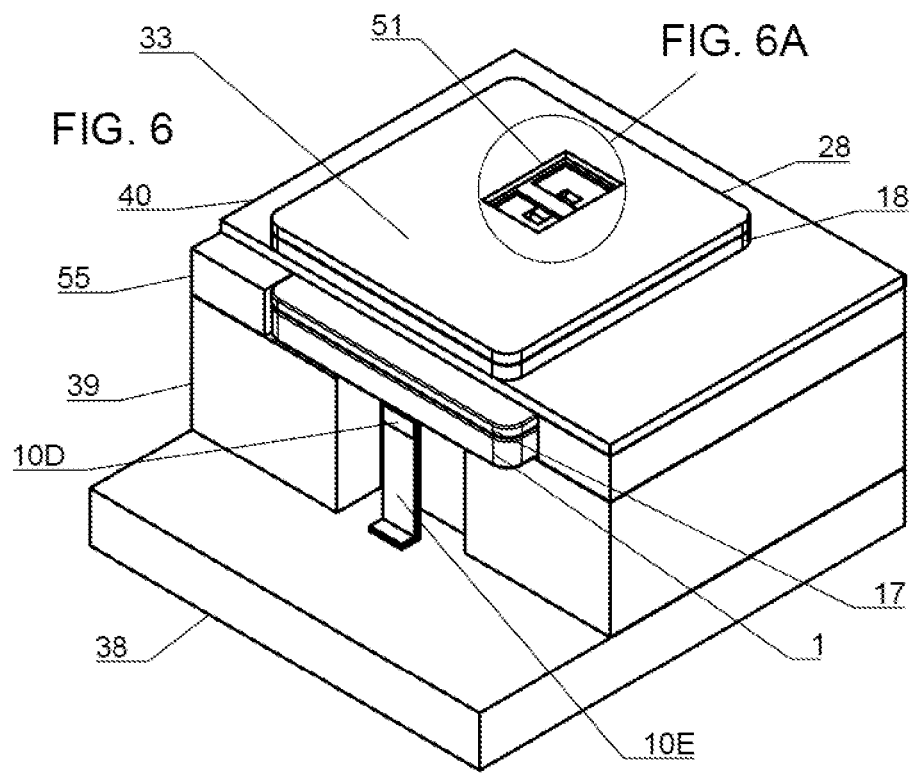
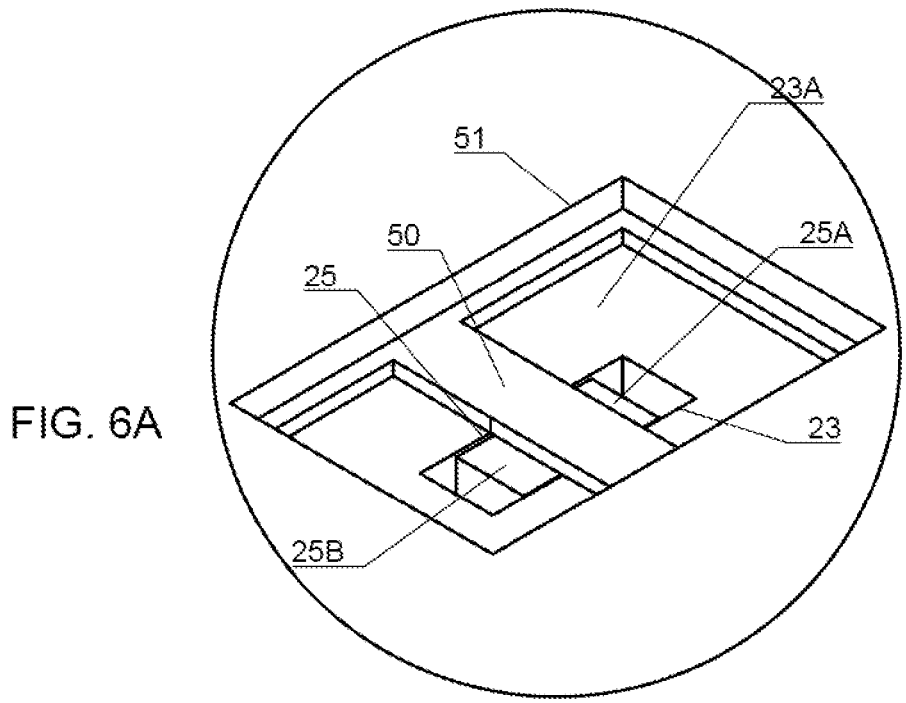

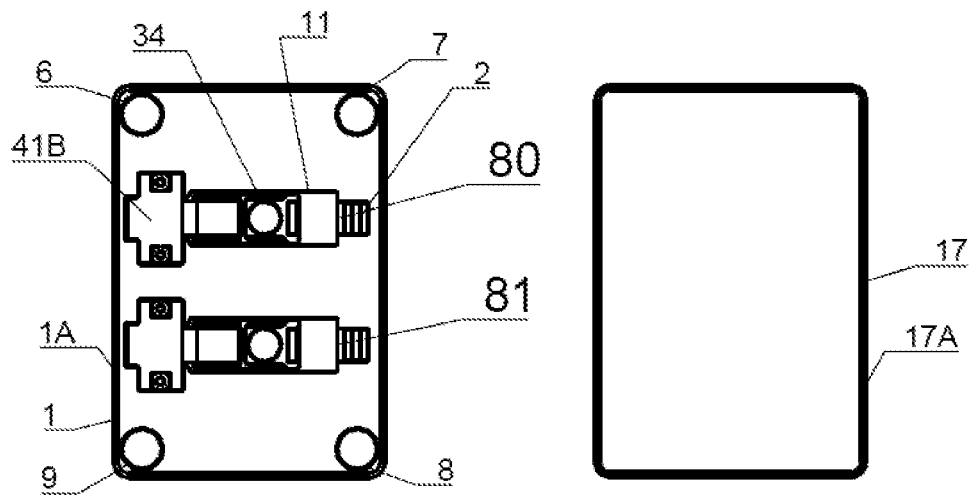
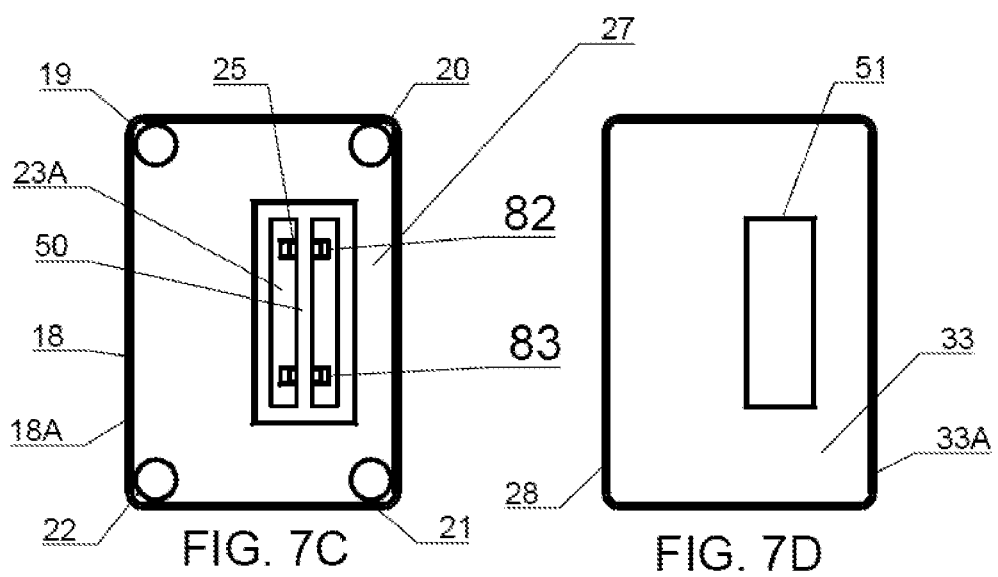
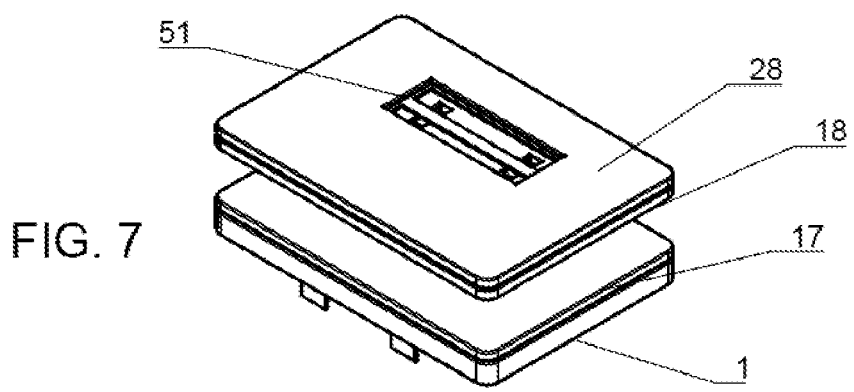

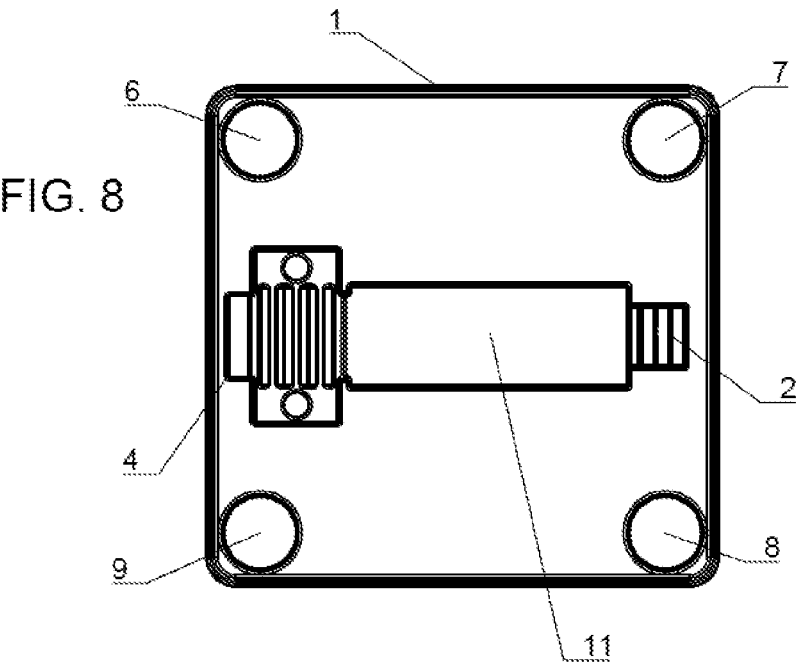
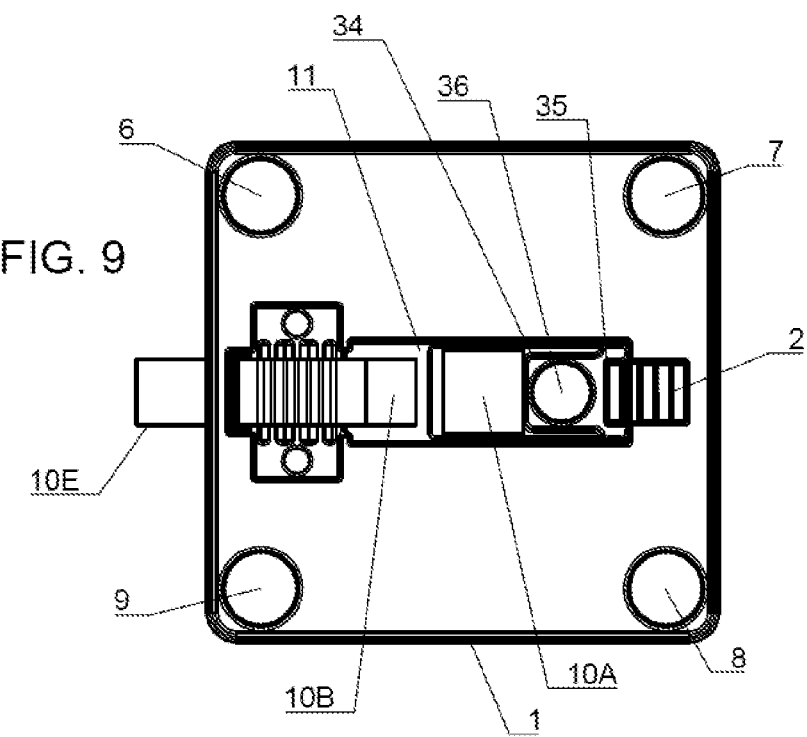

MOISTURE DETECTION AND INDICATOR SYSTEM AND METHOD OF USE WHILE MAINTAINING ROOF MEMBRANE INTEGRITY

CROSS REFERENCE TO RELATED APPLICATIONS

This application is a national stage filing under section 371 of International Application number PCT/CA2019/000129, filed on Sep. 10, 2019 published as WO2020/051675A1 on 19 Mar. 2020 and which claims priority to U.S. provisional application No. 62/730,507 filed on Sep. 12, 2018, the entire disclosure of these applications being hereby incorporated herein by reference.

FIELD OF THE INVENTION

The present invention relates to the field of devices, systems and methods for detecting and indicating moisture in buildings. More particularly, the present invention relates to the field of moisture detection and moisture indicating materials for use in roofs, and to a roofing leak detection system incorporating such materials requiring no punctures through the roof membrane, but can also be placed in walls on roofs or walls on buildings or homes.

BACKGROUND OF THE INVENTION

The primary function of a roof system is to keep the inside of the building dry. Roof insulation below the roof membrane keeps the building cool in the summer and warm in the winter. That functionality is reduced or lost if insulation becomes wet. Heating and cooling costs may soar in such an event, and the consequences of water in a roof system can be more serious—if not catastrophic. Further consequences may include insulation decay, corrosion of steel decks and insulation fasteners, rotted wood decks, toxic mold, annoying leaks, damage to interior walls and ceilings, spoiled stock and premature roof failure.

Leakage in existing roofs is a particular problem, especially when the roof has a nonconductive element at the bottom of the roofing envelope next to the deck, such as a vapor barrier or a secondary roofing membrane. In these cases, water leaking into the roofing envelope can saturate the insulation and other elements in the envelope without actually leaking into the building because the lowermost membrane acts as a barrier to the water. In time, water might run into the building via penetrations, such as vent stacks, curbs for mechanical equipment, conduits, etc., through the roofing envelope and be visible from underneath. By this time, corrective action may be as extensive as cutting cores in the roofing envelope to determine the extent of water damage; removing a large portion of the roof; performing infrared or other tests to indicate the current status of the roofing envelope; etc.

Additionally, when the roofing envelope becomes saturated with water, a portion of the planned energy efficiency from the roofing envelope is lost. The building structure may also experience the corrosive effects of water, therefore compromising its penetrations. Unbeknownst to anyone, this process is occurring in thousands of roofs across North America and, indeed, in the built environment anywhere in the world.

All of the foregoing can have significant cost consequences for the building owner, and in some cases, even for the building occupants. Further, any one of the foregoing conditions can cause disruptive roof replacement for a building owner, on top of any roof maintenance and repair costs. In the case of commercial building alone, wet insulation in flat commercial building roofs is a costly problem across the world, creating a multi-billion-dollar repair price tag for owners.

Today's high performance roof systems are more expensive and, along with greater complexity, typically require trained roof consultants to carry out daytime visual inspections. Statistically, it is known that approximately 80% of moisture leakage into buildings occurs at penetrations/roof projections, curbs, walls, parapets, drains and scuppers. Many such leaks are hidden and can accumulate in the membrane and insulation, slowly spreading out and destroying the roof system, often before any moisture drips enter the building. Other leakage can occur where water ponds on a roof and exposed roof membrane seams fail causing water ingress.

It is appreciated that it would be valuable if during visual roof inspections, one could detect such 80% of leakage into the roof system. Roof maintenance personnel, consultants and inspectors, however, typically cannot see moisture beneath the roof surface using just their eyes. Therefore, visual roof inspections are typically of limited value, and will often miss hidden roof leakage problems.

To detect moisture beneath the surface, more sophisticated tools for analysis are conventionally required, the use of which requires extra work, extra training, and extra costs for the service carried out. These tools include non-destructive testing using nuclear meters, capacitance/RF meters and infrared scanners. Destructive testing includes core cuts and moisture detection probes, but typically cores and probes aren't used until moisture is suspected or found with non-destructive tools.

On roofs, use of infra-red scanners is limited to a narrow "window of opportunity" to conduct examinations after sunset or at dawn; this means a follow-up visit to validate data during a daytime roof inspection and moisture probes. On roofs, IR Scanners are less useful or produce misleading results during the daytime after the sun has risen.

In the case of nuclear equipment, this can be used in the daytime, but is dangerous due to the radioactivity and therefore rarely used in practice. A special radioactive badge, additional safety precautions and training, and a license are required to use.

Electrical capacitance/RF meters can be useful, but require training, and require a dry roof surface to be used, which just like infrared is difficult or impossible in winter or on wet days. Due to the additional costs involved, roof professionals do not typically use these extra tools during routine roof inspections unless they are paid extra fees for carrying out this extra work. Thus, it would be advantageous and valuable to have an improved approach for detecting such hidden leaks during a visual inspection, not having the limitations (and costs) of equipment that is conventionally used. It was recognized that it would be very useful if a person walking on the roof could look over at the roof surface (and some walls), and know if there was moisture leakage (without having to resort to the use of electronic equipment/detectors). Additionally, it would be useful if any sensor that provides a visual indication of leakage into a roof system, didn't require a physical penetration of the roof membrane by the sensor, to provide the leakage status indication to the user or roof inspector.

Also, it would be useful if the non-penetrating sensor didn't require any electronics, batteries, solar cells or wires to convey this leak status indication to the user or roof inspector.

It is an object of the present invention to obviate or mitigate the disadvantages of these known moisture detection devices, systems and methods.

SUMMARY OF THE INVENTION

It is an object of the present invention to provide a dual part moisture detection and indicator device and system for use in detecting and indicating moisture leaks, which overcomes the functional and structural deficiencies of known detection means.

It is an object of the present invention to provide a device, method and systems within which device may be placed, in situ for detecting and locating leaks in roofing membranes.

It is an object of the present invention to provide the most efficient way to detect leaks in membrane roofing or waterproofing at different elevations in the roof system with a roof sensor that requires no roof membrane puncture or breach of any kind to use the sensor system where roof leak status information can be passed or conveyed from below the roof membrane, through the membrane (without a puncture or breach) and in which a roofer may install and use a device simply, inexpensively and easily.

The present invention provides a dual part moisture detection and indicator and system for use in detecting and indicating moisture leaks which does not require puncturing or compromise of the roof membrane. It is contemplated that the present invention has a particular useful application as a moisture detection and alert system for roofs, and is thus discussed and illustrated herein in the context of roofs; however, it should be understood that this may readily be adapted for use as a moisture detection and alert system for use in different scenarios, including in some buildings, building structures or parts of buildings. The variety of possible uses will become apparent through the present disclosure.

In accordance with an aspect of the present invention, disclosed herein is a system, method and apparatus for detecting moisture leaks in roofs and for providing a visual alert regarding such leaks, comprising a dual part moisture detection and indicator system. The moisture detection and indicator system comprises a wicking sensor, a wicking portion, a non-electronic trigger portion below the membrane, which is enabled to receive a non-electronic signal from the wicking portion and a non-electronic indicator portion above the membrane which is enabled to receive a non-electronic signal from the trigger portion and to thereafter produce a notification of a leak.

The means by which the a non-electronic indicator portion above the membrane is enabled i) to receive a non-electronic signal from the trigger portion below the membrane and ii) to thereafter produce a notification of a leak, can be achieved in a variety of ways as described and claimed herein. The core features of the invention are that the non-electronic indicator portion above the membrane communicates non-electronically with the trigger portion below the membrane and in turn the indicator portion thereafter creates a non-electronic signal/moisture alert. In one aspect the non-electronic signal and notification generation are achieved by the use of magnetic field coupling. In some aspects of the invention, actual magnets are used for such coupling; or in the alternative magnetic field sensing/indicating sheets, magnetic field sensing ferrofluid and the like are employed to the same end. As an alternative to the use of magnetic field coupling between the base trigger tray and end channel magnet push and pull "mechanical" means can be employed including, but not limited to elastic bands, wires, springs, and expanding material can be used to create the "trigger" within the trigger portion and the alert, within the indicator portion.

At least one wicking sensor is generally installed around an area here leak detection is required, and functions to wick moisture from a leak via the wicking portion, to the trigger portion that, via a non-electronic, magnetic field coupling, conveys leak status through a solid non-penetrated roof membrane, to an indicator portion above the roof membrane, which, in response to such magnetic field coupling, undergoes a visual change, providing an alert of moisture detection. As described in greater detail in the preferred embodiments section below, magnetic field coupling between the lower (under membrane) trigger portion and the upper (above membrane) indicator portion may be achieved in a variety of ways and all are fully within the scope of the present invention. One way, for example, is via movement of a magnet within the indicator portion causing an alert signal to activate as a result of a coupling of a first magnetic field within the trigger portion and a second magnetic field within the indicator portion, such coupling being activated by a material change in the wicking portion, said material change being caused, directly or indirectly, by moisture in the wicking portion from the wicking sensor.

It is contemplated that the alert will be such that it can be observed by a roof inspection professional during a roof inspection, and will serve to provide information to such professional to potential moisture leak issues; alternatively, the alert can be such that it can serve to alert a home or building owner to potential moisture leak issues in the roof, so that roof repair/service professionals can be called in for a closer inspection.

More specifically, the present invention provides a moisture detection and indicator for use in detecting moisture leaks anywhere on the roof, around roof top units (RTUs) and other structures on roofs, or out in the field area of the roof away from such RTU units and structures which comprises a) an exposed wicking sensor, permeable to moisture and generally, when in use, installed around an area where leak detection is required, and functions to wick moisture from a leak to a wicking portion; b) the wicking portion, which is non-permeable to moisture and longitudinally or otherwise joined to the wicking sensor, for enabling moisture wicking and moisture travel along the wicking portion, away from the wicking sensor; c) a trigger portion comprising a first magnetic field, which is below a roof membrane when in use, and engageable with the wicking portion; d) an indicator portion comprising a second magnetic field, which is above the roof membrane and removably aligned directly above the trigger portion, when in use; wherein moisture in the wicking portion from the wicking sensor directly or indirectly activates a material change in the wicking portion, which material change directs the trigger portion to couple of the first magnetic field and the second magnetic field, said coupling then activating the moisture alert within the indicator portion.

In one aspect; the non-electronic trigger portion below the membrane, which is enabled to receive a non-electronic signal from the wicking portion by way of material change in the wicking portion, comprises an enclosed trigger portion housing comprising i) at least one channel therethrough and associated housing aperture, for wicking portion feeding and placement within at least a part of the trigger portion housing; ii) means to generate first magnetic field; iii) means to non-electronically align the trigger portion with the indicator portion, when in use.

The present invention provides a device for use in detecting and indicating moisture leaks which does not require puncturing or compromise of a building membrane comprises i) a wicking sensor ii) a wicking portion longitudinally or otherwise joined to the wicking sensor; iii) a nonelectronic trigger housing for placement, in use; below the building membrane, said nonelectronic trigger housing adapted for receiving a signal from the wicking portion in response to moisture from the wicking sensor; and iv) a non-electronic indicator housing for placement, in use, above the building membrane and in alignment with the trigger housing, said a non-electronic indicator housing adapted for receiving a non-electronic trigger signal from the trigger housing and to thereafter for producing a notification of a leak.

The present invention provides a method of detecting and indicating moisture leaks which does not require puncturing or compromise of a building membrane which comprises:
a) detecting moisture at a wicking sensor;
b) wicking moisture from the wicking sensor to a wicking portion
c) effecting a material change in at least one part of the wicking portion as a consequence of the moisture, such change triggering engagement between a trigger portion and an indicator portion;
d) creating a detectable signal within the indicator portion in response to such engagement, such detectable signal being notice of moisture at the wicking sensor;
wherein trigger portion is adapted to be placed below the building membrane and is in functional engagement with the wicking portion and the wicking sensor and wherein indicator portion is adapted to be placed above the building membrane.

The present invention further provides a method of detecting and indicating moisture leaks which does not require puncturing or compromise of a building membrane which comprises
a) detecting moisture at a wicking sensor;
b) wicking moisture from the wicking sensor to one or more wicking portions;
c) effecting a material change in one wicking portion within a trigger end piece, as a consequence of the moisture, such change triggering engagement between a trigger portion within the trigger end piece and an indicator portion;
d) creating a detectable signal within the indicator portion in response to such engagement, such detectable signal being notice of moisture at the wicking sensor;
wherein the trigger portion within the trigger end piece is adapted to be placed below the building membrane and is in functional engagement with the wicking portion and the wicking sensor and wherein indicator portion is adapted to be placed above the building membrane.

In one aspect, the non-electronic indicator portion above the membrane which is enabled to receive a non-electronic signal from the trigger portion and to produce a notification of a leak comprises an enclosed indicator portion housing comprising i) a means to generate second magnetic field; ii) a top facing surface viewable to users; iii) means to generate an alert signal as an outcome of the coupling of the first magnetic field within the trigger portion and the second magnetic field; and iv) means to non-electronically align the indicator portion with the trigger portion, when in use.

In accordance with another aspect of the present invention, disclosed herein is a method for detecting moisture using such a moisture detection and indicator and system as described herein. More specifically, the present invention provides a method for detecting moisture leaks in a roofing envelope where the roofing envelope comprises a roofing membrane, possibly insulation coverboard, insulation, vapour barrier and deck, which without information travelling thorough roof punctures, comprises installing a moisture detection and indicator pair, as described and claimed herein, below and above the roofing membrane. More specifically, a trigger portion is installed below the roof membrane and an indicator portion is installed above the roof membrane. The installation does not require a roof membrane puncture or require routing leak status information through a roof top unit (RTU) or other projecting structure on said roof.

The indicator comprising an under membrane base sensor/trigger portion and an above membrane indicator portion. A key aspect of the invention is the pairing of the trigger portion and the indicator portion and the magnetic field (non-electronic) communication therebetween, in response to moisture detection. The under-membrane trigger portion comprises i) a wicking sensor, permeable to moisture in a vicinity around the under membrane base portion, when in use; a non-permeable wicking portion longitudinally joined to the wicking sensor, for enabling moisture wicking and travel away along the wicking portion, away from the wicking sensor; and iii) a means to generate a first magnetic field. The above roof membrane indicator portion comprises i) a means to generate a second magnetic field which may be coupled with the first magnetic field from the trigger portion; and ii) a means to generate an alert signal as an outcome of the coupling of the first magnetic field within the trigger portion and the second magnetic field.

In one aspect, personnel will periodically view the indicator portion looking for an alert that moisture has wicked from wicking sensor under the roofing membrane, to the under roof membrane base trigger portion and this status is made available to indicator portion which is above the roof membrane. The alert, as described further herein, may not require personnel to attend on the roof site but may be conveyed through a measurement system, within the indicator portion, which forwards alert data via an internet gateway for viewing on a mobile app, a web platform or for storage (for example, in a cloud-based monitoring centre).

In accordance with another aspect of the present invention, disclosed herein is a system for detecting moisture using such a dual part moisture detection and indicator. More specifically, the present invention provides a system for detecting and locating leaks in a rooting envelope where the roofing envelope comprises a roofing membrane, said system comprising an under membrane trigger portion (a bottom base) and above membrane indicator portion (top) in pair. Such pairing does not involve breach or compromise of the roofing membrane.

In one aspect, the under membrane trigger portion consists of i) a below the roof membrane moisture detection wicking sensor, with an optionally shielded wicking section and trigger section, and which comprises at least one piece which is fully permeable to moisture in a vicinity around the wicking sensor, when in use under a roofing membrane; ii) a wicking portion, longitudinally or otherwise joined to the wicking sensor, for enabling moisture wicking and travel away along the wicking portion, away from the wicking sensor, wherein at least one part of the wicking portion is actuated directly or indirectly to a material change, in response to moisture, said material change thereafter being enabled to direct the trigger portion to couple its (first magnetic field) to the second magnetic field of the indicator portion, said coupling then activating the moisture alert within the indicator portion. The above roof membrane indicator portion comprises i) a means to generate a second magnetic field which may be coupled with the first magnetic field from the trigger portion in response to a material change in the wicking portion; and ii) a means to generate an alert signal as an outcome of the coupling of the first magnetic field within the trigger portion and the second magnetic field. Once the system is installed, no extra tools or meters are required in order to indicate hidden moisture leakage into roof insulation, roof membrane and roof membrane stripping near curbs, roof jacks, vents and other roof top units or out in the roof field area away from such RTU.

Furthermore, the present invention can indicate leakage day or night, during wet or dry weather, at any time. Once the system is installed, it is possible to detect and indicate early moisture leakage anywhere on a roof area, not just near roof projections, through periodic visual inspection, before hidden moisture damage becomes a greater problem.

In another aspect, the present invention comprises a network, mobile application, web platform, system, and program product, which comprises a consolidated forum for users including but not limited to roof installers, inspectors, building owners, building maintenance personnel to detect leaks by a means which does not require puncturing or compromise of a building membrane which comprises
a) detecting moisture at a wicking sensor;
b) wicking moisture from the wicking sensor to a wicking portion
c) effecting a material change in at least one part of the wicking portion as a consequence of the moisture, such change triggering engagement between a trigger portion and an indicator portion;
d) creating a detectable signal within the indicator portion in response to such engagement, such detectable signal being notice of moisture at the wicking sensor;
wherein trigger portion is adapted to be placed below the building membrane and is in functional engagement with the wicking portion and the wicking sensor, wherein indicator portion is adapted to be placed above the building membrane and wherein signal is delivered to a network, mobile application, web platform, system, and program product such that user can view and access signal.

The device, method and system of the present invention will be a reliable and inexpensive application that can be universally installed at most types of roof membranes anywhere on the roof membrane, including near roof drain valleys, and near roof projections, curbs, walls, drains and scuppers.

The embodiments in this application finally correct the underlying problems with roof sensors that penetrate the roof membrane.

DRAWINGS—FIGURES

FIG. 1 is a top plan view of FIG. 5C, illustrating an embodiment of a moisture wicking portion and trigger end piece, which is an exploded version;

FIG. 1A is a bottom plan view of FIG. 5C, illustrating an embodiment of a moisture wicking portion and trigger end piece, which is an exploded version;

FIG. 5B is a cross section side view illustrating one embodiment of a trigger assembly within the trigger base housing, including wicking sensor, (which is the area marked in FIG. 5D);

FIG. 5D is a bottom plan view of an of a trigger base housing;

FIG. 5F is an enlarged side view of a moisture wicking portion, which is an exploded version of the specific area marked in FIG. 5B;

FIG. 5G is an enlarged side view of a moisture wicking portion and clamping portion, which is an exploded version of the specific area marked in FIG. 5B;

FIG. 6 is an isometric view of the entire in situ architecture of the moisture detection and indicator of the invention, in particular, illustrating a top indicator housing, roof membrane, trigger housing with visible parts of both wicking sensor and wicking portion;

FIG. 6A is an enlarged isometric view of the indicator portion, which is an exploded version of the specific area marked in FIG. 6;

FIG. 7 is an isometric view containing the top indicator housing (two channel version) with visible parts of both wicking sensors and the trigger housing (two channel version);

FIG. 7A is an top plan view of an interior layout of a housing of a trigger portion (two channel version), open and exposed (without cover or lid, which is shown in FIG. 7B);

FIG. 7B is a plan view of an underside of a lid of a housing of a trigger portion (two channel version);

FIG. 7C is a top plan view of an interior layout of a housing of an indicator portion (two channel version), open and exposed (without cover or lid, which is shown in FIG. 7D);

FIG. 7D is a plan view of an underside of the lid of the housing the indicator portion (two channel version), shown in FIG. 7C;

FIG. 8 is a line drawing, a top plan view of a trigger housing without trigger end piece engaged therein; and FIG. 9 is a line drawing, a top plan view of a trigger housing with trigger end piece engaged therein.

Figure 5:
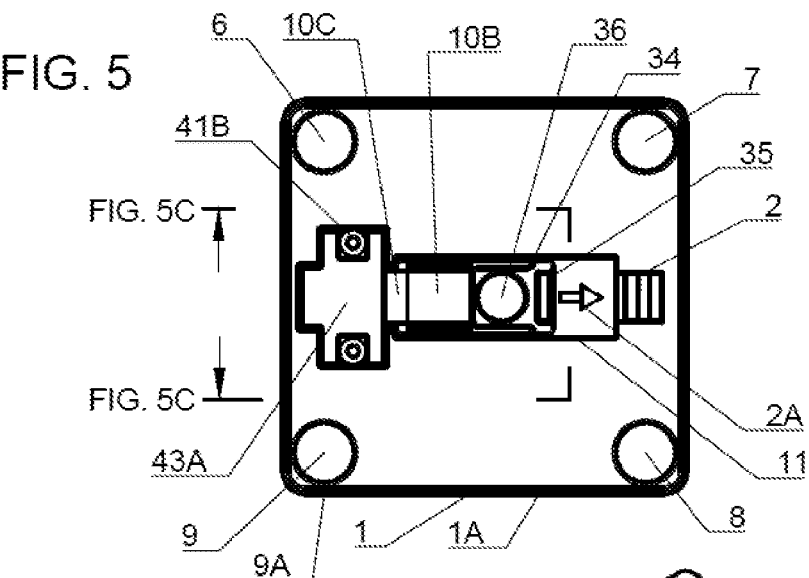
FIG. 5 is a top plan view of an interior layout of a housing of a trigger portion (trigger base housing), open and exposed (without cover or lid, which is shown in FIG. 2)

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF PREFERRED EMBODIMENTS

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention is susceptible to many variations, including scaling for capacity, in so long as design and process parameters are maintained. Accordingly, the drawings and following description of the preferred embodiments are to be regarded as illustrative in nature, and not as restrictive.

I. Terms

The term "device" means any machine, manufacture and/or composition of matter, unless expressly specified otherwise, in accordance with the invention. More specifically, device generally refers to the pair of (i) the below the roof membrane wicking sensor and trigger base unit and (ii) the above the roof membrane top indicator portion of the invention.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" or "variant" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise. The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represents" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g.", "ex" and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus, if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

The term "roof top unit" or RTU is intended to have broad meaning and to encompass a variety of roof projections and penetrations such as, for example, curbs for mechanical equipment, walls, roof jacks, vents, flashing, parapets, drains, and scuppers. For greater clarity, the term includes curbs, curbs for mechanical equipment, HVAC curbs, walls, roof intake and exhaust fan curbs, roof intake and exhaust vent curbs, goose-neck roof jacks, flashing, vents, parapets, drains, scuppers, roof walls, intake and exhaust vents with flanges, roof parapets, roof control joints, roof drains, roof scuppers, roof plumbing stack flashing, roof gas stack flashing, roof electrical stack flashing, roof jack flashing, roof skylight curbs, roof gum or pitch pans, and roof retro box flashing.

The term "roof field area" is any roof section including drain valleys that are away from RTU. This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. .sctn.1.72(b). The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

II Overview

The present invention provides an apparatus for detecting moisture leaks in roofs and for providing a visual alert regarding such leaks, comprising a dual part moisture detection and indicator portions. A first key aspect of the invention is how these two portions operate and how they communicate with each other. A trigger portion is adapted to be placed, in use, below the roof membrane and act in functional engagement with a wicking portion and wicking sensor, as explained further below. An indicator portion is adapted to be placed above the roof membrane, in use, and is enabled to receive a non-electronic signal from the trigger portion and to thereafter produce a visual notification of a leak as a direct consequence of this signal. There is no physical contact between the trigger portion and the indicator portion. There is no electronic communication or wires and no electronic parts etc . . . . There is no puncture or breaching the roof membrane in order for these two portions to co-function. Communication between the trigger portion and the indicator portion is based upon a variety of non-electronic means, including, but not limited to magnetic field coupling which is affected by at least one material change in the wicking, portion in response to moisture. The various ways in which this can be achieved are described further herein.

A second key aspect of the invention is how a moisture effected material change in the wicking portion "signals" the trigger portion to notify the indicator portion to create an alert. In one way, this is achieved by trigger portion coupling its magnetic field (the first magnetic field) to the magnetic field of the indicator portion (the second magnetic field). The various other ways in which this can be achieved are described further herein.

In one preferred aspect, this sequence of events using the device of the invention is as follows:
  Moisture detection at wicking sensor and wicking, of moisture to wicking portion
  Material change in/at (at least one part of) the wicking portion from moisture
  Engagement and movement of magnetic field coupling triggered by the material change
  Creation of signal within indicator portion in response to magnetic field coupling The device and method of the invention is unique and has not been previously appreciated for use in roof moisture detection contexts. While there are many moisture detection systems which operate electronically, for example, using X and Y wires which form a grid and measuring conductivity or measuring current between a sensor on top of the roof membrane and a conductive layer underneath, these systems are more complex, prone to failure of components and/or require roof membrane penetrations to operate.

Material Change in/at (at Least One Part of) the Wicking Portion from Moisture

The apparatus of the invention comprises a wicking sensor (in a sensor zone, permeable to moisture and enabled to be oriented, in situ, to capture moisture from in or around a desired area and to wick captured moisture away from the sensor area), a wicking portion (non-permeable for moisture travel and not detection), and a non-electronic trigger portion which is enabled to receive a non-electronic signal from the wicking portion in response to a material change in the wicking portion. Within the scope of the invention, material change is intended to have a broad meaning and encompasses any change to the wicking portion, as a consequence of moisture detection, which non-electronically facilitates the transfer of a signal to the trigger portion. In a preferred form, the material change causes the separation of at least one moiety of the wicking portion, proximal to or within the trigger housing, from the remainder of the wicking portion which is conjoined with the wicking sensor, such that the least one moiety of the wicking portion, proximal to or within the trigger housing can participate in signaling to other components of the trigger housing that moisture has been detected.

Most conveniently and easily, as will be understood fully throughout this disclosure, this material change involves some type of physical disruption of the wicking portion, for example, separation, breakage, dissolution of a part, stretching, shrinking, swelling, raising, lowering vertical or horizontal or diagonal movement, pulling, pushing, or any combination thereof.

Signal from the Wicking Portion Material Change to Trigger Portion

In one aspect, a material change in the wicking portion enables movement of one or more magnets within the trigger housing, such movement being detected by magnetic field coupling within the indicator housing, the latter triggering an alert signal.

In another aspect, a material change in the wicking portion enables movement of one or more magnets within the trigger housing, such movement triggering the movement of one or more magnets in the indicator housing, the latter triggering an alert signal. In another aspect, a material change in the wicking portion enables movement of one or more magnets within the trigger housing, such movement triggering movement or image change of ferrofluid (fluid which moves under the influence of a magnetic field and produces spikes along the magnetic field lines when the magnetic surface force exceeds the stabilizing effects of fluid weight and surface tension) in the indicator housing (or magnetic viewing film with a ferromagnetic emulsion), the latter triggering an alert signal. For example, in one aspect, the viewing film will become darker when the trigger housing upwardly facing magnet (aka tray coupling magnet) is moved under the film and the tray coupling magnet field lines are perpendicular to the film surface, and it turns light when the coupling magnet is moved away. When the tray coupling magnet is placed under the film, it will show the magnet as dark with a light outline. With the text wet and dry separated above the path of travel the tray coupling magnet, this would serve as an indication of base trigger status. In another aspect, a material change in the wicking portion enables movement of one or more magnets within the trigger housing, such movement being detected by a ferromagnetic metal within the indicator housing, the latter triggering an alert signal. In another aspect, a material change in the wicking portion enables signaling by a ferromagnetic metal within the trigger housing, such signaling being detected by one or more magnets within the indicator housing, the latter triggering an alert signal.

It is to be understood that the term "movement" is taken to have the broadest possible meaning and includes horizontal and vertical movement, rolling, sliding, turning, tilting, toggling, flipping, raising or lowering, rotating or any combination of the foregoing. It is to be further understood that the signal alert in the indicator portion may be triggered, as noted above or by, for example,

- magnetic paper (or film) that shows a magnetic field or other display material that shows a magnetic field under the presence of the magnetic field from the trigger housing.
- One or more magnetic pop up pins or magnets in the top indicator portion (possibly displacing a dark, different color or opaque liquid (i.e. that will be immune from freezing during winter conditions)
- An upper cylinder tube, within the indicator portion, which is reactive to (enabled to rise or be pulled down under the influence of a magnetic field from the trigger housing
- One or more means, within the indicator portion, which is enabled to a visual change in shape, position, orientation, shade, light reflections, or color based the influence of a magnetic field from the trigger housing It is to be understood that these aforementioned "magnetic field communication" components are not limited in shape, size, orientation or placement within the trigger portion and the indicator portion.

In one preferred aspect, an end of the wicking portion, most distal to its conjoining with the wicking sensor (wicking end portion) is removably attachable to a trigger end piece for placement in a channel of the trigger housing (the housing and channel described in more detail below). The purpose of the trigger end piece, in this configuration, is to act as conduit for the signal from the materially changed wicking portion to the trigger portion. Regardless of how the wicking portion is materially changed, the trigger end piece, residing within the channel of the trigger portion, serves to provide "notice" by movement itself or by enabling the movement of one or more other trigger housing components in order to affect the magnetic field coupling between the trigger portion and the indicator portion.

In one preferred aspect, the trigger end piece comprises an attachment end for removable attachment to wicking end portion; ii) a holder for an upwardly facing magnet (facing towards the indicator portion); and iii) a holder for a forwardly facing magnet (facing a fixed magnet disposed on an end wall of the channel of the trigger housing). In this way, movement of wicking material (occasioned by a material change) causes i) movement of forwardly facing magnet towards fixed magnet; ii) movement at i) then causes upwardly facing magnet to be detected (by its magnetic field) by at least one magnet within the indicator portion, such latter detection and magnet moving creating the alert. The trigger end piece, its conjoining with the wicking portion end and placement within the channel of the trigger housing are shown best in (FIGS. 5 and 5B) Also depicted is the critical space between the forwardly facing magnet on the trigger end piece and the fixed magnet disposed on an end wall of the channel of the trigger housing, such space being of sufficient channel length to discourage any premature magnetic connection there between but to enable a reliable magnetic attraction/connection once there is a material change in the wicking portion, enabling it to separate from the wicking sensor (for example, once the first moiety of the wicking portion which is engaged with the trigger end piece separates from the second moiety of wicking portion which is engaged with the wicking sensor, in response to moisture).

In one aspect, as described further below, one preferred means for material change in the wicking portion is via moisture-induced breakage of a seam on the wicking portion such that the wicking portion splits in two upon exposure to moisture. This seam may be pre-created during manufacture or installation along the length of wicking portion by joining two parts of the wicking sensor via a water-soluble adhesive. In this way, a first moiety of the wicking portion which is engaged with the trigger end piece separates from the second moiety of wicking portion which is engaged with the wicking sensor. It is preferred that the separation is, in use, inside of the channel of the trigger housing. The separation enables the forwardly facing magnet on the trigger end piece to move by magnetic attraction towards fixed magnet on the end wall of the channel housing. Pre-moisture detection and pre-material change in the wicking portion, these two magnets had been forcibly separated by virtue of the fact that the forwardly facing magnet on the trigger end piece was held in place due to engagement with the "intact" wicking portion. For greater clarity, as noted above, it is possible, in either the trigger housing or the indicator housing to replace one or more of the magnetic-field creating magnets with a ferromagnetic metal, but this is not a desirable configuration in all use contexts, For example, it would lower and inhibit performance and makes less reliable through thicker roof systems (for example SBS MB membrane systems). Upper top indictor component movable downward facing magnet, or lower-case movable magnet, both with vertically oriented magnetic fields, could have one of the magnets replaced with a ferromagnetic metal. This ferromagnetic metal would be strongly attracted by a magnetic field, but it would not be a magnetic or have any substantial magnetic field. A combination of these metals may be used. The common ferromagnetic metals include, for example, iron, nickel, cobalt, gadolinium, dysprosium and alloys such as steel that also contain specific ferromagnetic metal such as iron or nickel. For example, the upwardly facing magnet(s) in the trigger end piece, with the trigger housing could pull on a ferromagnetic metal component(s), present in the indicator housing, to effect movement. Or vertically oriented magnetic field movable magnet(s) in the indicator housing could be attracted to a ferromagnetic metal present in the trigger housing in order to effect movement. The trigger end magnet and fixed end magnet could also have one component a ferromagnetic metal component(s), The above roof membrane indicator portion (aka indicator housing) can be re-used over again, but the lower below the roof membrane sensor and trigger portion requires replacement or restoring with a new dry wicking sensor to the trigger portion to be able to be used for future leak detection (which could be replaced by a wicking cartridge, for ease of use).

In the present device (with the indicator housing permanently adhered and/or placed (without adhering, but using for example positional magnets to hold in position) over the roof membrane over the base trigger housing, no batteries are required to be used or recharged, and there are no electronics to fail. During a roof inspection, the roof inspector or maintenance personnel can use just their eyes, with no extra tools, to instantly see if there is leakage below the roof membrane near the RTU or anywhere in the roof field area away from RTU, particularly at drain valleys where moisture tends to accumulate. If so, corrective action can be taken, or the personnel can take photos for preparing a roof report. As such, the present system is a low-cost, powerful, adaptable to different rooting structures, and can be relatively easily installed in existing roof systems.

Optionally, a small sticker can be placed on the above roof membrane indicator portion to indicate how the technology works for the novice roof inspector, but learning is intuitive and simple. Alternately, the indicator portion could be carried by the roof inspector and placed down on the roof directly over the membrane that is over the base sensor portion. In this case, a high visibility membrane (pad in the shape and size of the sensor indicator) or similarly sized coating would have previously have been installed and adhered on roof membrane directly over the base sensor portion. The roof inspector would see this indicator high visibility membrane and place the indicator over it to test for moisture beneath the membrane.

Roof Sensor Pair:

As described throughout, the invention provides a two component sensor pair, (i) the below the roof membrane moisture sensing and trigger "base unit" which is often and interchangeably referred to herein as the "trigger portion" or the "trigger housing", (ii) and the above the roof membrane sensor magnetic field sensing and coupling indictor "top unit" which is often and interchangeably referred to herein as the "indicator portion" or the "indicator housing". The base unit moisture detection and trigger and top unit magnetic field coupling and indicator sensor pair are for use in detecting moisture leaks out in the field area of roofs (away from roof projections, curbs, parapets and walls), and near roof top units (RTUs) and other structures on roofs. However, the moisture detection and triggering unit could also be placed on its side behind roof membrane stripping within a wall or parapet wall, or behind drywall, wood siding, aluminum siding or other non-ferromagnetic material.

In one preferred form, the base unit of which comprises a) a wicking sensor, permeable to moisture in a vicinity around the base unit of the sensor pair, when in use; b) a wicking portion, non-permeable to moisture and longitudinally joined to the wicking sensor; for enabling moisture wicking and travel away along the wicking portion, away from a more distant wicking sensor; and c) and a movable trigger end piece that is removably attached to an end of the wicking portion (distal to the wicking sensor) wherein movable trigger end piece comprises two magnets. One is a forward-facing magnet which when set for use, is placed a small distance away from a separate fixed magnet on the end wall of the channel of the trigger housing in which the trigger end piece and attached wicking portion rest. After a material change to the wicking portion causes separation (as discussed above), the magnetic field between the forward facing magnet and the fixed magnet on the end wall of the channel pulls on the end of the trigger end piece towards the fixed magnet. A second magnet in the trigger end piece faces upwards with its magnetic field coupling towards the roof membrane and above indicator portion/housing, magnet with its downwardly facing magnet (downwardly facing magnet, but same magnetic orientation). The upwardly facing magnet has an upward facing magnetic field whose function is to penetrate the roof membrane and influence the above roof membrane top magnetic field coupling sensor and indicator portion with its movable magnet that serves as an indicator portion to provide a visual alert of moisture below the membrane.

At the core of the sensor pair invention are base and top units and their non-electronic (for example, magnetic field-based) communication upon the conveyance of moisture detection. In order to understand the operation of the system, it is instructive to consider that the base unit moisture detection and trigger comprises three "zones": a first, the sensor zone, permeable to moisture and enabled to be orientated, in situ, to capture moisture from in or around a desired area and to wick captured moisture away from the sensor area. The wicking sensor in this zone, in some embodiments, is bendable or otherwise flexible enough to be positioned anywhere in a roof structure. It is, however, required that at least one part of the wicking sensor at this capture zone is permeable. In preferred aspects, it is positioned, in one type of use, under a roof membrane on insulation or coverboard overlayment, or anywhere down to the vapour barrier and roof deck. The second "zone" is for moisture travel and wicking and not for further moisture detection and capture. In this zone, the wicking portion is also bendable or otherwise flexible enough to place in a roof structure. The wicking portion is designed in this manner with a purpose to avoid false moisture readings from anywhere but the desired capture zone.

It is a zone which, for example, may be associated with layers of insulation, but this is not the target moisture to be detected and picked up and captured by the wicking moisture sensor. The second zone is merely a moisture travel conduit to the third and final zone, which enables the triggering movement of within the trigger housing, where, in one embodiment, the movement of a magnet on the trigger end piece is pulled towards a separate fixed magnet on the trigger housing itself. While the trigger end piece is moving, an upward facing magnet on a top surface of the trigger end piece (might be interchangeably referred to herein as the "tray magnet" or the "upwardly facing magnet") is likewise moved, whereby the upwards facing magnetic field of this upwardly facing magnet passes through the roof membrane and into the upper top magnetic field coupling sensor and indicator housing to influence and control a moveable magnet within the indicator housing. The upper top unit magnet is contained in a chamber slot, within the indicator housing, allowing movement along the slot of the moveable magnet that provides a visual indication of moisture leak.

It is submitted that no other moisture detection and indicator device functions in this manner, with no punctures through the roof membrane, with this degree of flexibility of use and adaptability near a variety of roof structures and other projections or anywhere out into the field area of the roof membrane. On the base unit, the wicking sensor can be as long or short or as flexibly disposed as desired within the desired moisture capture zone. The wicking portion functions integrally with the wicking sensor and may be flexible enough to turn, orient and bend around structures, carrying moisture to the base trigger portion, which, upon the occurrence and detection of a "material change" to the wicking portion, triggers the moving trigger end piece magnet and its moving magnetic field. On the top magnetic field coupling and indicator unit, the moving magnetic field from the lower base unit induces movement in the top unit moveable magnet which provides a viewable, visual alert to a user. Thus, the journey from sensor zone to alert zone, from the base wicking sensor and trigger to the upper top magnetic field coupling and indicator portion of the present invention provides for a novel, unique and very useful roof moisture sensor.

Although not intending to be limited to engagement with any one particular roof system and structure, it can be seen from exemplary FIG. 6 with the base unit wicking sensor placed below the membrane and at roof deck level. The configurations, orientation and placement of the wicking sensor can be varied as needed for each commercial, residential or industrial use. It is preferred that the base trigger portion comprises a housing/chamber with at least one channel therein (although it is to be understood that multiple channels may be included for placement of multiple trigger end piece/wicking portion couplings, with each wicking portion being engaged with a separate wicking sensor). Within such a channel, and as noted previously, a trigger end piece removably attaches to a matching wicking portion. In one aspect, the wicking portion attached to the trigger end piece is bonded (at or near, or preferably on the point of attachment to the trigger end piece) with an adhesive that dissolves in connection with moisture such that a moiety of the wicking portion (attached to trigger end piece) separates upon exposure to moisture travelling from wicking sensor. When wicking portion within the channel and adjacent to the trigger end piece becomes wet and wicks moisture into the base trigger unit, the bond between the two moieties of the wicking portion separates, the trigger end piece is pulled, via its attached forward-facing magnet, towards the separate fixed magnet at the end of the channel wall. The upward facing trigger end piece magnet also moves when the wicking material bond is broken and the wicking portion separates. This upward facing trigger end piece magnet's magnetic field then penetrates through the top lid of the trigger housing, through the roof membrane, and through the base plate of the top indicator housing to influence and move the top magnetic field coupling sensor unit moveable magnet. The top unit movable magnet is confined in its own slot or chamber (in the indicator housing) and is positioned so that it can only move back or forth within this slot or chamber. The top unit moveable magnet can be coated with different colors of paint for each half of the magnet, which when positioned at one end of the slot only shows one color, and when positioned at the other end of the slot or chamber shows the other color. In this configuration the slot is of a size, shape and configuration to only allow the magnet to move ½ of the magnet length in either direction. The middle of the chamber or slot is obscured by a cover (or bar), whereby it hides the opposite end color when slid in one direction, and the hides the other end color when slid in the opposite direction. In this configuration, the chamber or slot is effectively divided into three sections, with the middle ⅓ hiding the contents below. Only the ⅓ portion of chamber or slot at each end is visible to show the color that would be exposed in it.

Methods of Use:

The present invention comprises a method for detecting moisture leaks in a roofing envelope where the roofing envelope comprises a roofing membrane which comprises installing a two part sensor pair unit, one base wicking sensor and trigger unit below the roof membrane and one top magnetic field coupling sensor and indicator unit above the roof membrane. The base unit below the roof membrane is comprised of a wicking moisture detection sensor(s) section and that is placed within the roof structure below the membrane, below insulation coverboards, below a layer or layers of insulation, resting on the roof vapour barrier or vapour retarder, or resting on gypsum, or resting on wood, metal or concrete decks. The base unit is comprised of a) a wicking sensor, permeable to moisture in a vicinity around the exposed wicking portion b) non-permeable moisture wicking portion, longitudinally or otherwise joined to the exposed wicking sensor, for enabling moisture wicking and moisture travel along the wicking portion, away from the exposed wicking sensor; and c) a trigger portion, comprising a trigger end piece, longitudinally joined to wicking portion, wherein, upon the occurrence of a material change to the wicking portion, the trigger end piece effects at least two magnetic field couplings. In one preferred embodiment, as described above, the material change comprises some type of severance of or breakage in the wicking portion such that one moiety of the wicking portion is free to "travel with" the trigger end piece within the channel of the trigger housing.

In one preferred embodiment, as described above, the trigger end piece comprises two magnets with different functions/purposes and which both move with the movement of the trigger end piece. The trigger housing comprises, in each channel at least one fixed magnet at the end point of such channel. One magnet, a "forward facing magnet" on the trigger end piece is attracted by magnetic force to the fixed magnet at the end of the channel. However, using setting and operation and until there is moisture detected, there remains a space between the forward-facing magnet and the fixed magnet on the channel end. This space is of sufficient length so as to ensure that trigger end piece is not drawn to the end of the channel unless there is a material change in the wicking portion which would properly free the trigger end piece to "move", thereby signaling moisture detection. In other words, the trigger end piece is only free to move under force of its forwardly facing magnet's attraction to the fixed magnet, within the channel, once detection of moisture by first, the wicking sensor and then, the wicking portion. In normal operation, the forwardly facing magnet and the fixed magnet are maintained apart by the "dry," integrity of the wicking portion. It might be desired to lubricate channel "slot" with, for example, oil, graphite or silicone lubricants, Teflon® or other non-sticky material to minimize friction in movement of the trigger end piece (once activated). In normal operation, once moisture is detected using the apparatus and method described herein. The forwardly facing magnet and the fixed magnet are drawn (often quickly) to each other (via trigger end piece travelling within its slot/channel) in response to the material change to the wicking portion. Keeping friction-reduced conditions in the slot/channel ensures accurate operation of the apparatus.

The second magnet on the trigger end portion (the upwardly facing magnet) is the magnetic field "communicator" with indicator housing above the roof membrane. Upon movement of the trigger end piece under force of its forwardly facing magnet's attraction to the fixed magnet, the upwardly facing magnet also moves and thereby to enabled to influence (and move) the top magnetic field coupling sensor and indicator unit's moveable magnet(s). The top magnetic field coupling sensor and display unit comprises a chamber or slot that holds a downwards facing magnet that is influenced and moved horizontally by the magnetic field of the upwardly facing magnet. Where there is more than one wicking sensor/wicking portion/trigger end piece/channels within the trigger housing, there would be more than one corresponding chamber or slot and moveable magnet in the top magnetic field coupling sensor and indicator unit. The upper top unit moveable magnet serves as an indictor portion. Periodically viewing the indicator portion for a visual alert indicating that moisture has wicked from below roof membrane wicking sensor via the wicking portion, triggering a material change which causes the movement of the trigger end piece within the trigger housing and thus the movement of the upwardly facing magnet, which influences and moves the upper top unit moveable magnet to provide the indication of moisture leakage into the roof system.

A key aspect of the two-part roof sensor unit pair invention is that there are no punctures required through the roof membrane for the user to determine the leakage status of the roof system. As discussed above, the two-part roof sensor unit be used in a variety of roof systems.

The failure to detect, find and correct minor roof deterioration in the earliest stages is considered the greatest cause of premature roof failure, primarily due to deterioration of the roof insulation. This is particularly true of roofing materials applied on low-slope or flat roofs. Costly roofing problems are often the result of design deficiencies or faulty application of the roof system. Even when properly designed and applied, all roofing materials deteriorate from exposure to the weather at rates determined largely by the kind of material and the conditions of exposure. In a preferred aspect, the method of the present invention is used for detecting and locating leaks and wet insulation in a roofing envelope where the roofing envelope includes a roofing membrane, which is disposed on top of an insulation package (and possibly an insulation overlayment above the insulation), which is, in turn, disposed on top of a roof deck. The roof system may also include a vapour barrier below the insulation package. The roofing envelope may also include at least one roof structure/projection/RTU, which penetrates at least the roofing membrane. RTUs may also include impinging walls that border a roof area, as well as parapets or control joints that run through a roof. Any wall that has roof flashing up against it in order to make the roofing envelope watertight at that juncture is an impinging wall. "Impingement" refers to any of the structures included within either of these terms that impinge on or interrupt a waterproofing or roofing membrane. Although impingements usually impinge on all roofing membranes included in a multi-layered roofing and waterproofing membrane assembly, it is understood that some impingements may impinge on only one or less than all layers.

Within the method of the invention the base trigger unit wicking sensor(s) and wicking portion(s) may be disposed at or through any of the layers of roofing material, as desired, but does not require a puncture through the roof membrane. The placement of the two-part sensor unit anywhere in the field area of the of roof without requiring a roof membrane puncture is a distinct advantage, as roof membrane punctures themselves have the added potential risk of leakage. An example of the inventions usefulness is if the base moisture sensing and trigger units are installed at roof drain valleys during installation of the new roof system. When it rains, the drain valleys (and roof drain sumps) tend to fill with water. Any membrane seams or penetrations in the roof in the drain valleys carry a huge risk for future leakage, but with the two-part no puncture roof sensor, the drain line valley (and roof drain sump) leakage status can be monitored with no additional risk to leakage. In this sense, with the new no puncture invention we aren't limited to installing the roof sensor just at roof projections to avoid extra punctures in the membrane.

Mobile Application:

In one aspect, the method of the invention additionally comprises the step of identifying the moisture indicator top unit by way of at least one of serial number entry on a portable microprocessing device, QR code image capture on a portable microprocessing device, bar code capture on a portable microprocessing device, or other image or feature capture on a portable microprocessing device. The portable microprocessing device is provided with (for use offline) or has direct online access to an application for collection, storage, processing and conveyancing of information relating to, one or more of: the moisture indicator top unit, in situ, its features, GPS location, building details, visual alert records, roof leak history, past repairs, contact details of key building and repair personnel (the "reports"). A user may then view reports and act accordingly as required in regards to any detected moisture leaks.

The portable microprocessing device is selected from the group consisting of hand-held devices, microprocessor-based or programmable consumer electronics, mini-computers, mobile smart phones, personal digital assistants, and tablets.

In a preferred form, one means by which communication is triggered is via visual cues readable by the portable microprocessing device, for example visual cues readable by either a scanner and camera within the portable microprocessing device. Any visual representation of information that may be processed by vision recognition software may be used. One example of a visual cue is a QR code. Though QR Codes are used here for descriptive purposes, it is not necessary that QR Codes themselves be the technology of choice. Any visual representation of information that is easily consumed by vision recognition software may be used. An alternative is simply to have a user manually enter into the portable microprocessing device a serial number to avoid errors that might be occasioned by damage to QR codes exposed to the elements.

Within the scope of the invention, there is provided a mobile application, encoded by software, which enables a user with the application installed on his/her portable microprocessing device, to collect, store, process and convey information and data relating to, one or more of: the top indicator unit, in situ, its features, GPS location, building details, visual alert records, roof leak history, past repairs, contact details of key building and repair personnel. The application may include a vision recognition component that would permit the application to view and decode the information in the exact same manner as the commonly available visual recognizer. The mobile application would enable immediate reporting of leaks, exact location, time-stamps activity, and enable viewing comparative data related to one or more sensor top indicator units, over any desired time frame.

Application may be downloaded by users/customers from various mobile software distribution platforms, or web applications delivered over, for example, HTTP which use server-side or client-side processing (for example, JavaScript) to provide an "application-like" experience within a Web browser. App may be free or fee-based. Ongoing services provided with the app may be fee-based. To install a mobile device application, a user will typically either drag and drop an icon to the device or click a button to agree to the installation. Uninstalling one is also straightforward, and typically involves deleting or dragging the icon away from the device. When a user uninstalls a mobile device application, he or she may also lose all the data relating to it because, in many cases, it is not stored separately. The number of applications that can be installed on a single device depends on the devices's memory.

In support of this application, still another aspect of the disclosure is directed to a networked apparatus comprising: a memory; a processor; a communicator; a display; and an application maintenance module adaptable and configurable to process content relating to one or more sensor top indicator units.

Still another aspect of the disclosure is directed to a non-transitory, computer-readable storage media for tangibly storing thereon computer readable instructions for a method comprising: receiving data relating to a sensor from a mobile device; a mobile application communicating the data to a server causing the server to identify the data and any associated request, and type of device; in response to identifying the data and the mobile device type, delivering response information to the mobile device in a format suitable for display on a mobile device interface. The systems and methods described herein, in respect to the mobile application, rely on a variety of computer systems, networks and/or digital devices for operation. As will be appreciated by those skilled in the art, computing systems and web-based cross-platforms include non-transitory computer-readable storage media for tangibly storing computer readable instructions. In order to fully appreciate how the web-based cross-platform smart phone application creation and management system operates an understanding of suitable computing systems is useful. The web-based cross-platform smart phone application creation and management systems and methods disclosed herein are enabled as a result of application via a suitable computing system. In one aspect, a computer system (or digital device), which may be understood as a logic apparatus adapted and configured to read instructions from media and/or network port, is connectable to a server and can have a fixed media. The computer system can also be connected to the Internet or an intranet. The system includes central processing unit (CPU), disk drives, optional input devices, such as a keyboard and/or mouse and optional monitor. Data communication can be achieved through, for example, communication medium to a server at a local or a remote location. The communication medium can include any suitable means of transmitting and/or receiving data. For example, the communication medium can be a network connection, a wireless connection or an Internet connection.

It is envisioned that data relating to the present disclosure can be transmitted over such networks or connections. The computer system can be adapted to communicate with a participant and/or a device used by a participant. The computer system is adaptable to communicate with other computers over the Internet, or with computers via a server. Each computing device (including mobile devices) includes an operating system (OS), which is software, that consists of software programs and data that runs on the devices, manages the device hardware resources, and provides common services for execution of various application software. The operating system enables an application program to run on the device.

As will be appreciated by those skilled in the art, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor. A user launches an app created by an app creator and downloaded to the user's mobile device to view digital content items and can connect to a front-end server via a network, which is typically the Internet, but can also be any network, including but not limited to any combination of a LAN, a MAN, a WAN, a mobile, wired or wireless network, a private network, or a virtual private network.

In a simple preferred aspect of operation, a user, detecting a triggered 2-part sensor unit would use a mobile device (having access to the application thereon) to identify the top indicator component, by any means noted above. If by taking a photograph of the serial number, photo may be stored as Sensor Photo with or without other particularizing details. Mobile device may identify GPS of the triggered 2-part sensor unit. This may be stored as GPS Location of Sensor, with or without other particularizing details. User may be prompted by the application to enter serial number manually. User may be prompted by the application to take locale or regional context photos of the roof leak location. This may be stored as Overview Photos, with or without other particularizing details. User may be prompted by the application to enter details on the building location etc. . . . . . This may be stored as Building Details, with or without other particularizing details. User may be prompted by the application to enter personnel details relating to, for example, building manager, owner or repair companies. This may be stored as Personnel Details, with or without other particularizing details. The application would automatically record date and time of all entries. The application may prepare a report for the user and may trigger a variety of other actions including, but not limited to:

Preparing a full report on the particular 2-part sensor, including its GPS location, optionally with satellite photo location, and optionally with a pin-point arrow/guide on a satellite photo to specific building and specific sensor location Preparing a full report on the particular 2-part sensor including past and current leakages detected by the particular 2-part sensor.

Prompts in regard to emailing, reports on the particular 2-part sensor to personnel and third parties or providing push notifications, via the application and/or association website and/or social media platforms to personnel and third parties.

User may need to enter more information on any given 2-part sensor indicator component at first instance/first use and less information on subsequent uses of the application.

System of the Invention and Placement/Installation:

The present invention provides a system for detecting and locating leaks in a roofing envelope where the roofing envelope comprises a rooting membrane. The system generally comprises the two-part moisture detection and indicator components, as described fully herein and some type of roof system. As noted above, the roof system provides the structure to hold the trigger housing and the indicator housing, allowing the sensor pairs to be installed in place at most vulnerable areas for possible leakages, with the top magnetic field coupling sensor and indicator housing placed over the wicking sensor/wicking portion and trigger housing.

In roof systems, RTU could include a base flange, a vent, a wall, a parapet, a curb, a hatch, a gumpan, a drain or a scupper or other RTU. These are all potential sources of leakage that the two-part sensor pair can be installed near when reroofing.

The trigger housing and trigger end piece, with associated wicking portion/wicking sensor attachment are typically installed when installing a new roof, wherein the trigger housing is non-preferrably placed on top of the insulation or insulation coverboard, or preferably it can be recessed below the top of the insulation or insulation coverboard. For optimal operation, if it is recessed into the insulation or insulation coverboard, the top surface of the trigger housing should fully touch the underside of the roofing membrane without any gaps to allow for full magnetic coupling. As such, with thicker coverboards or insulation, to raise the trigger housing, spacer shims may be added below the trigger housing (under its bottom) to raise it. These spacer shims could be made from roofing membrane or insulation or other suitable materials. Alternately and preferrably the trigger housing height thickness could be manufactured thicker to match the same as any insulation coverboard thickness. For example, insulation coverboard is typically ½" thick, therefore, the trigger housing would be manufactured ½" in thickness. Then it would be a simple matter to cut out the shape of the trigger housing from the insulation coverboard and insert it in place and cut a hole for the wicking portion to deck level. The roof sensor trigger base housing can be installed under all single ply roof membranes. With protection of an asphalt cover board or similar material over the top of the base sensor lid, the base sensor housing can be placed under SBS modified bitumen (MB) torch applied roofs, or hot asphalt applied roof systems (without gravel ballast) where the sensor is located.

Dual test chambers/slots (or more) with the trigger housing allow for moisture testing below the top layer of insulation due to the sealed heat shrink-wrapped casing over part of the wicking portion. Only the end of the wicking sensor would be exposed to sense the moisture and wick it along, via the non-permeable wicking portion, to the trigger housing. For example, one wicking sensor can be placed on top of the insulation or insulation coverboard, or anywhere inbetween layers of insulation. Another wicking sensor can also be placed on top of the insulation or insulation coverboard, or anywhere in-between layers of insulation. With a longer shielded wicking portion between the exposed end of the wicking sensor and the trigger housing, it can be fed down further into the insulation to be installed on gypsum, the vapour barrier or the roof deck.

During installation, wicking sensor and wicking portions are oriented as desired below membrane on insulation, on coverboards, below cover boards, at lower levels of insulation or above vapour barriers, on gypsum boards or on steel, wood or concrete decks. An end of wicking portion (distal to the wicking sensor) is fed within an end wall (or floor) aperture of the trigger housing and it is then connected to the trigger end piece. There are a variety of reasonable ways to make such a connection, and one is shown in the figures herein. What is key is that the method of attachment is important to the extent that this connection must be "firm enough" to hold separate (maintain a space between) the forward facing magnet on the front of the trigger end piece from its natural attraction to the fixed magnet at the end wall of the channel.

When the wicking sensors are installed with the trigger housing, the roofers preferably roll out the field membrane to cover the base trigger housing. As they pass the trigger housing position under the roofing membrane, the users can mark the general location of the roof with a crayon, pencil or spray paint, or other method. Later the top indicator housings will be installed over the marked area of the roof membrane. If the marking the roof membrane surface was missed or forgotten, a user can simply and easily find the general location of the covered trigger housings with the top indicator portion, or with a metal detector or possibly with just a small piece of ferromagnetic metal that would be attracted to the magnets within the trigger housings.

It is to be understood that these steps are guidelines and different installation designs and methods could be used for installing the trigger housing, wicking sensors, wicking portions and the invention is not limited by the methods described in this document.

When it is desired to match the top indicator housing with an installed trigger housing, a direct and accurate alignment of the two parts is required, so that the "moisture detection magnetic field coupling" will be operable, but can be designed to allow for slight shifting of the indicator portion. One easy means by which the trigger housing and the indicator housing may be maintained in a positional relationship (without the use of membrane puncturing screws or ties which physically bind the two parts together) is by magnetic coupling. Herein, this is referred to as "magnetic connection positional coupling" and is distinct from the "moisture activated magnetic field coupling" described above. In a preferred form, each of the trigger housing and the indicator housing, at their peripheries, comprise a set of preferably four magnets (for example, one at each of the four corners of each housing) such that guiding the orientation and placement of the indictor housing occurs when a user brings the indicator housing near or above the trigger housing and a magnetic connection coupling is made between the indicator housing magnetic field coupling magnets and the trigger housing magnetic field coupling magnets. The natural physical attraction and repulsion of the magnets in the trigger housing and indicator housing only allows the indicator housing to be pulled to the roof and rest in place in the proper orientation (essentially "locked" in place by the magnetic coupling) on the roof when the indicator housing and trigger housing are both oriented in the same direction.

This magnetic connection coupling is achieved by the pull between opposite polarity magnets and the repulsion with same polarity magnets and provide the resistance and pull forces to provide tactile and visual placement feedback to the installer to show how to install the indicator component. By way of example: on the trigger housing, the magnets on the right side of the channel/slot are orientated with opposite polarity facing up so that they are attracted to each other, even if only by a small amount of attraction due to the distance between the magnets. On the trigger housing, the magnets on the left side of the channel/slot are also orientated the same way with opposite polarity facing up so that they are attracted to each other, even if only by a small amount of attraction due to the distance between the magnets.

Therefore, both sides of the trigger housing perpendicular to the channel slots have the same polarity pointing up and repel each other, if even only by a small amount of repulsion due to the distance between the magnets.

On the indicator housing, the magnets on the right side of the channel/slot are orientated with opposite polarity facing up so that they are attracted to each other, even if only by a small amount of attraction due to the distance between the magnets. On the indicator housing, the magnets on the left side of the channel/slot are also orientated the same way with opposite polarity facing up so that they are attracted to each other, even if only by a small amount of attraction due to the distance between the magnets. Therefore, both sides of the indicator housing perpendicular to the channel slots have the same polarity pointing up and repel each other, if even only by a small amount of repulsion due to the distance between the magnets. Additionally, both the trigger housing and the indicator housing magnets are installed so that the trigger housing and the indicator housing are attracted to each other.

If the indicator housing is oriented 180 degree backwards, the same polarity between the magnets at the corners of the trigger housing, and the top magnetic field coupling sensor and indicator unit component housing, will prevent placement of the top magnetic field coupling sensor and indicator housing. For example, north pole repels a north pole and south pole repels a south pole. An orientation different than correct will tend to pull or push and rotate the magnets, and therefore the top magnetic field coupling sensor and indicator housing into correct orientation where it essentially "locks" into position. Sliding the indictor slightly will have a force applied by the magnets in the base and indicator that will tend to snap the indicator back into "locked" position. When in the "locked" position, the top indicator unit won't easily turn or be shifted in position. Tactile feedback provides the learning experience where the process can be done with one's eyes closed.

This is similar physics as happens when dropping a magnet near another lower non-moveable magnet, where the top magnet is pulled over to the correct magnetic orientation and position.

In this example the falling magnet may be oriented 180 degrees either way as it sticks. However, in the case of this invention, the trigger housing and indicator housing have fixed position pairs of opposite polarity magnets. Therefore, the indicator housing and trigger housing can only orient in one direction, and essentially "lock" in position relative to each other. When opposite polarity magnets are attracted to each other.

It might be desired to also position wicking sensor housing behind a wall surface, oriented vertically on its side.

In this way, the indicator housing may be installed over the wall surface and adhered to it with adhesive, peel and stick membrane, or some other method to attach it to the wall. If the indicator is carried with the roof inspector, a high visibility membrane can be located over the base sensor housing position and can lock in position over the base sensor housing.

Once moisture is detected, it might be desired to reset the components in the trigger housing and in the indicator housing, for reuse. In regard to the indicator housing, no action is required if the base sensor housing is reset to dry. It is easy and simple to do. In regard to the trigger housing, the wicking sensor/wicking portion will need to be replaced and new wicking sensor/wicking portion attached to trigger end piece. Then the trigger end piece is reset (ensuring space 2a) as described fully herein. The base sensor housing could have a replaceable cartridge for this purpose where the dry wicking sensor and trigger tray assembly is contained.

In some embodiments, it might be preferred to permanently install the top indicator housing to roof surfaces. There are a variety of non-limiting ways to achieve this. It might be desired to do this as these following examples show:

A. Adhering the indicator housing to the upper roof surface of single ply membrane roofs like EPDM, TPO and PVC membrane (or other single ply membrane):

Method #1:
    Primer roof surface.
    Use roof bonding adhesive on roof and bottom of the indicator housing
    Use roof lap sealant caulking around perimeter of indicator housing (optional).

Method #2:
  Primer roof surface.
  Mark roof location (one problem is that moving housing, once placed, is difficult). This may be accomplished by first placing the top indictor housing on the roof in the correct position and orientation before marking the four sides of the roof where it sits with a marking crayon, pencil or pen. Then the double-sided EPDM seam tape release sheet would be pulled off and the indicator housing would be placed on the roof
  as extra protection use roof lap sealant caulking around perimeter of indicator housing (optional).
B. On SBS MB roofs the top indictor housing may be installed as follows to the membrane:
  Embed granules on SBS MB roofs granulated membrane surface.
  Primer roof surface.
  Mark roof location (one problem is that moving housing, once placed, is difficult. This may be accomplished by first placing the top indictor component on the roof in the correct position and orientation before marking the four sides of the roof where it sits with a marking crayon, pencil or pen. Then the double-sided EPDM seam tape release sheet would be pulled off and the top indicator housing would be placed on the roof
  Apply a thin bead of elastomeric roof mastic to the bottom of the top indicator component and correctly orient and position the top indicator housing onto the roof
  Use roof lap sealant caulking around perimeter of top indicator housing (optional).
C: Include sensor base in EPDM, TPO or PVC membrane:
  The top magnetic field coupling sensor and indicator housing could be fabricated with a small piece of a single ply membrane that would be adhered to the main field membrane with adhesive, heat welding, seam tape or other method depending on the roof membrane system.
Magnet Preferences:
  With the scope of the invention, a variety of magnets may be used and for differing purposes, with different sizes and shapes, with different placements and orientations. In regard to the magnetic connection coupling magnets within each of the trigger housing and indicator housing for secure, positionally accurate alignment and holding, and also the moisture detection magnetic field coupling magnets, a variety of magnet types are suitable and include, but are not limited to: older types of magnets with lower Tesla magnetic field number rating, Ferrite, ceramic, alnico. Preferably rare earth types with higher Tesla magnetic field number rating: neodymium or samarium-cobalt or any combination thereof.
  In regard to the number of magnets, placement and orientation, it is submitted that a skilled person, given all of the details on the architecture of the system, housings and method if the invention, would be able to make small adjustments and changes as needed, for each particular use. In regard to the magnetic connection coupling magnets within each of the trigger housing and indicator housing for secure, positionally accurate alignment and holding in place, any reasonable number of magnets may be used. Four in each housing (at corners of the housings) is preferred. Other numbers may be used as long as there is an opposing polarity on one end or side of housings to allow only one orientation installation orientation between the trigger housing and indicator housing.
  In regard to the moisture detection magnetic field coupling magnets, any configuration or number of magnets within the trigger housing is fully within the scope of the invention if the end result is that the magnet configuration i) responds to a material change in the wicking portion and ii) activates a magnetic field coupling with the indicator housing, in some way.

In preferred aspects of the device of the invention, and as depicted in the figures below, there are magnetic connection coupling magnets within each of the trigger housing and indicator housing for secure, positionally accurate alignment and holding in place which are referred to as positional magnets or mating magnets or Permanent Cylinder Magnets on Trigger/Indicator Housings and shown as 19, 20, 21 and 22 for the indicator housing and 6, 7, 8 and 9 for the trigger base housing. These can be any shape such as, for example, square, rectangle, cylinder or other shaped magnets but are most preferred to be cylindrical.

It is preferred that the non-electronic indicator housing comprises four cylindrical positioning magnets, one at each corner, wherein two are front cylindrical indicator housing positioning magnets and two are back cylindrical indicator housing positioning magnets and wherein the trigger housing also comprises four cylindrical positioning magnets, one at each corner, wherein two are front cylindrical trigger housing positioning magnets and two are back cylindrical trigger housing positioning magnets and wherein the back cylindrical trigger housing positional magnets and are of opposite polarity orientation to the front cylindrical indicator housing positional magnets to ensure that the indicator housing can only be positioned with one orientation relative to the trigger housing. This makes setting and alignment of the entire device easy and foolproof.

In preferred aspects of the device of the invention, and as depicted in the figures below, the indicator housing comprises an indicator magnet 25 which is movable upon receipt of the trigger signal from the trigger housing from an untriggered position (no moisture detection) to a triggered position (moisture detection), thereafter for producing a notification of a leak and wherein the two front cylindrical indicator housing positioning magnets are of the same polarity and orientation as the indicator magnet so that, until moisture detection and triggering, indicator magnet is held in place (cannot physically be pulled into a triggered position) by the two front cylindrical indicator housing positioning magnets.

In preferred aspects of the device of the invention, and as depicted in the figures below, the trigger end piece 34 comprises a forward-facing magnet 35 and upwardly facing magnet 36. The forward-facing magnet is of a polarity such that it is attracted to a fixed magnet 2, disposed at a very end of a channel within the trigger housing. Until the triggering event (moisture detection), there is a space between forward-facing magnet 35 and fixed magnet 2. This space and the maintenance thereof is an indication of no moisture and no activation of the device/alerts. These magnets can be any shape such as for example, square, rectangle, cylinder or other shapes but are most preferred to be rectangular.

In preferred aspects of the device of the invention, and as depicted in the figures below, the indicator housing 18 comprises one or more indicator magnets 25, which move from an untriggered to triggered position (activating an alert) as describer further herein. These magnets can be any shape such as, for example, square, rectangle, cylinder or other shapes but are most preferred to be rectangular.

More specifically, when the indicator housing is placed down on the roof over the trigger housing the following happens. The front/forward positional magnets 20 and 21 on the indicator housing, having the same magnet polarity and orientation as the indicator magnet 25 and essentially forces the indicator magnet 25 back into the untriggered position. When there is no force from the upwardly facing magnet 36 pulling the indicator magnet 25 forward to the triggered position, the indicator magnet 25 cannot physically be pulled into the triggered position as it is held back with positional magnets 20 and 21. This preferred arrangement, within the device of the invention prevents false positives, rather than have the indicator float freely without a coupling magnet field to force it, and the user wrongly interpret the sensor trigger status. In order to achieve this, indicator magnet 25 is preferably positioned a suitable distance back from positional magnets 20 and 21 (but not too far back so that these positional magnets do not force the magnet back). Having the same polarity orientation is critical.

In preferred aspects of the device of the invention, and as depicted in the figures below, the trigger housing comprises a trigger end piece 34, setable when in use within a channel of the trigger housing, and which trigger end piece is removably attachable to one end of the wicking portion distal to the wicking sensor (the "trigger portion"), wherein trigger end piece comprises a forward facing magnet 35 and an upwardly facing indicator housing coupling magnet 36, wherein channel of trigger housing comprises a fixed magnet 2 which is attracted to the forward facing magnet.

The indicator housing comprises an indicator magnet 25 which is movable upon receipt of the trigger signal from the trigger housing from an untriggered position (no moisture detection) to a triggered position (moisture detection), thereafter for producing a notification of a leak, wherein the upwardly facing trigger housing coupling magnet is purposely positioned, pulled substantially back from the indicator magnet, so that when the indicator housing is correctly positioned and adhered to the building membrane, directly over the trigger housing, a pull between the indicator magnet and the upwardly facing trigger housing coupling magnet is substantial and when there is a trigger of moisture detection, the forward facing magnet is essentially "slingshotted" or forced towards the fixed magnet and the upwardly facing trigger housing coupling magnet engages the indicator magnet and helps it overcome friction.

More specifically, upwardly facing (tray coupling) magnet 36 is purposely positioned, pulled substantially back from the upper indicator magnet 25, so that when the indicator housing is correctly positioned and adhered to the roof surface directly over the base sensor housing, the pull between the upper indicator magnet and lower tray coupling magnet is substantial and when the base is triggered helps slingshot the tray towards the sensor channel end magnets. At the same time, the tray coupling magnet grabs hold of the upper indicator magnet and helps it overcome friction below its surface to rocket it towards the opposite triggered end. Otherwise, the coupling of the tray magnet directly over each other could limit the travel of the indicator magnet due to friction below the indicator magnet pulling on each other. The tray coupling magnet would also have more friction with the ceiling of the base sensor lid.

Alert Signaling

Although a variety of different alerts/notifications are within the scope of the invention, it is preferred that, whatever mechanism is applied, it is highly visible to the naked eye on or near the top surface of the indicator housing. In some instances, the alert will be some visual cue on the actual housing itself, but it may also be audio-based (an alarm, for example) or signal based if being relayed through an internet enabled communications module within the indicator housing. For example, trigger coupling or indicator magnet position change (indicating leak status) may be conveyed through Wi-Fi, internet enabled communications module or other radio frequency method.

In regard to the latter, information may be captured by monitoring the positional change of the indicator magnet with a hall effect sensor, or infrared transmitter and transistor pair, or other sensing technology, all of which is known to a skilled person in the art. For example, a microcontroller IC circuit, such as those manufactured by PIC may be used to control the operation, including a Wifi circuit with electronic component accessories. Alternately, a custom IC circuit may be provided to replace the PIC microcontroller and Wifi circuit, or other microcontroller selected that includes Wifi circuitry or that uses other wireless communication technology. Among other energizing means, a solar cell and battery may be used to power the circuit.

In one aspect, the indicator housing's magnet(s) colours can be tinted to a different color: Alternate colors can be used for the magnet such as yellow or orange to indicate moisture leakage, or other color for non-leakage. Other colors can also be used indicating dry or wet. White, silver, gold or other bright reflective paint or coloring agent, material, or substance can be used to aid indication. In another aspect, the indicator housing's top cover may have bright and/or fluorescent colors to provide high visibility. In another aspect the indicator housing may have fluorescence properties to allow glowing at night after absorbing ultraviolet radiation. In another aspect the indicator housing may comprise some added reflective particles or other like substance to allow reflections from artificial light sources or sunlight. In another aspect the indicator housing may comprise reflective "cat's eyes" to make it highly visible. In another aspect the indicator housing may comprise a magnifying lens or lenses built in to aid in visual inspection. In another aspect the indicator housing may comprise an alert with a printed message, for example, an indicator magnet may include a message printed on it that alerts the observer. For example, a message could read: "LEAK". In another aspect the indicator housing may additionally comprise or be associated with a small flag on a bendable pole to demark location.

In another embodiment, a magnet in the trigger housing may be configured with a magnetic field that pushes up against an opposite polarity orientation magnet whose movement upwards shows that the upper display top is centered correctly over the lower base. Alternatively a magnet with the same polarity orientation could lower upper magnet supported above the upper lid. Such movement might, for example, displace an opaque liquid to reveal the upper magnet upper surface that could be painted a revealing color.

Indicator Housing Options:
1. Alternatively, the indicator housing may comprise a Peel & Stick adhesive attached to its underside.
2. Alternatively, the indicator housing may comprise an adhesive glue applied to its underside.
3. Alternatively, the indicator housing may comprise a mastic or adhesive applied to its underside with lap sealant caulking applied to the edges of the caulking.

Detailed Description of Figures

Turning to the figures, wherein like numerals represent like features on the device.

Figure 2:
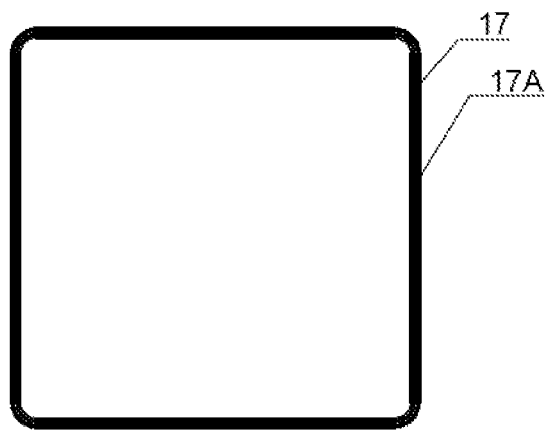
FIG. 2 is a plan view of an underside of a lid of a housing of a trigger portion.

Referring to FIG. 5, there is provided an interior layout of a trigger housing 1, without base lid 17 (shown in FIG. 2), open and exposed (without cover or lid, which is shown in FIG. 2). Trigger housing 1 comprises four permanently positioned cylinder magnets 6, 7, 8 and 9 that are positioned to have different, but planned magnetic field polarity orientations. It can be seen that trigger housing 1 magnet 9 is placed into base depression 9A. These four permanently positioned cylinder magnets 6, 7, 8 and 9 have magnetic fields that are oriented to face up vertically perpendicular to the trigger housing. The trigger housing also has one chamber slot (also referred to as channel) 11 that is formed in the housing that trigger end piece 34 can fit and then move within (in response to a moisture detection event).

Permanently positioned "fixed" magnet 2 is placed at the end of channel/chamber slot 11. It shall be noted that magnet 2 can be one solid magnet, or be comprised of more than one magnet coupled together with their magnetic attraction for each other. This magnet 2 is positioned and oriented so that the magnetic field faces the direction of the long direction of the chamber slot. Additional slots and magnets could be provided within the housing if required to sense moisture at different elevations within the roof system. Each trigger end piece 34 has a permanently attached forward facing magnet 35 that faces the chamber slot magnet 2, with a separation distance 2A between the two magnets respectively 2 and 35. This separation distance 2A can be set as required for optimum performance, but typically would be 13 millimeters apart (However, can change dimension with specific design requirements). This distance provides for a proper triggering of the sensor by allowing the magnets to snap together with the strong attractive magnetic fields of magnets 2 and 35 (upon detection of moisture and a material change in the wicking portion), but not so far apart that the attractive magnetic field between the magnets 2 and 35 would be too weak to move the moveable trigger end piece 35 towards magnet 2. Refer to FIG. 1 where the trigger end piece 34 also has a wicking section 10A on its upper surface 37 at the opposite end of forward facing magnet 35, where exposed wicking portion 10A is attached to the upper flat surface 37 on trigger end piece 34 with a permanent adhesive and/or mechanical attachment (for example stapling, or riveting) or other method of attachment.

Figure 5C:
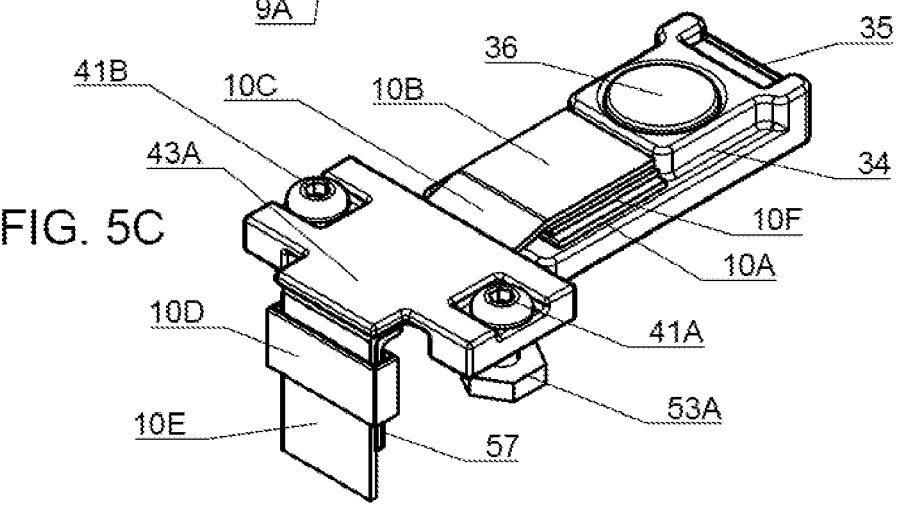
FIG. 5C is an isometric view of a moisture wicking portion, which is an exploded version of the specific area marked in FIG. 5.

Looking at FIG. 5C, the forward end of exposed wicking portion 10B is overlapped onto exposed wicking portion 10A where it is attached with (in one preferred embodiment) a water dissolving adhesive 10F. The overlap section 10B can be designed as required, but typically could be approximately 5 to 10 millimeters long.

More specifically, the amount of overlap of 10B also controls and affects the length of time for the "material change" to occur i.e. moisture to dissolve the water dissolving adhesive which is shown on also shown magnified in FIG. 5F as 10F. Wicking portions 10B to 10E, inclusive are one continuous wicking piece with 10E, which is a wicking sensor (permeable to moisture). However, for clarification, each of these portions are labeled separately to explain their function: 10B, 10C, 10D and 10E. Referring to FIG. 1, during set up, exposed wicking portion 10E (no heat shrink tubing covering as exists around wicking portion 10D) extends through heat shrink tubing 10D (as shown magnified in FIG. 5G) via the underside of base trigger housing 1, port/opening 4 (as shown in FIG. 5D) along wicking section 10C shown in FIG. 5G between removable term bar 43A and base sensor housing section 43B (also see magnified FIG. 5G) extending along wicking section 10B that overlaps onto wicking section 10A on trigger end piece 34 (see FIG. 5F).

Referring to FIG. 1, there is provided an illustration of one embodiment of a moisture detection system, generally indicated at 42 and comprising a moisture wicking portion generally indicated at 44 and trigger system (comprising trigger end piece 34) generally indicated at 46. Moisture wicking portion comprises wicking sensor 10E and wicking portions 10B to 10D. As described in more detail below, 10B to 10D portions are differentiated as to functionality. Also referring to FIG. 5C, trigger end piece 34 removeably attaches with its wicking portion 10A to wicking portion 10B and comprises two magnets, forward facing magnet 35 (which, in situ, faces chamber slot magnet 2) and upwardly facing magnet 36. Portion 10A on the trigger end piece 34 is comprised of the same wicking material as found in 10B to 10E, but is separate and adhered and or mechanically attached to trigger end piece 34. 10F is a water dissolving adhesive applied to wicking portion 10A and forms a bond between wicking portions 10A and 10B when compression is applied to the two pieces until moisture wicks along from 10E to 10B to dissolve the adhesive 10F. In FIG. 1, wicking portion 10C is shown with extra lines to represent ripples indicating compression lines or ripples formed in 10C when (removable) term bar 43A (shown best in FIG. 1A) is mechanically attached to trigger base housing 1 (with its rippled surface below 43B), with term bar 43A as also shown in FIG. 5B and in magnification 5G.

Referring to FIG. 1A, shows the backside of the FIG. 1 pieces and sections. Stiffening material 57 is adhered to the wicking portion at 10E and 10D, with the heat shrink tubing at 10D encasing part of the stiffener portion 57 and the wicking portion inside of 10D. Term bar 43A is shown on its underside where wicking portion 10C lays across it in this backside view. 34A is a section of trigger end piece 34 where the plastic has been removed, to reduce friction between the trigger end bottom surface and channel floor of the base sensor housing.

Referring to FIG. 5D, shows the underside of trigger base housing 1 where the wicking sensor 10E exits the housing through port 4. 53C and 53D are hexagon shaped holes in the underside of trigger base housing 1 where term bar fastening nuts (see FIG. 5C) 53A and 53B (53B is hidden from view in FIG. 5C) are inserted, and fastening screws 41A and 41B (see FIG. 5D) are fastened to the nuts.

Looking at FIG. 5B, lid 17 rim 1A mates with the trigger base housing 1 to form a seal between the lid 17 and trigger base housing 1. The two pieces can be sealed with a waterproof adhesive along this rim. Although not shown in the figures, lid 17 may comprises a serial number, QR code, bar code or other "indicator housing identifying means".

Figure 3:
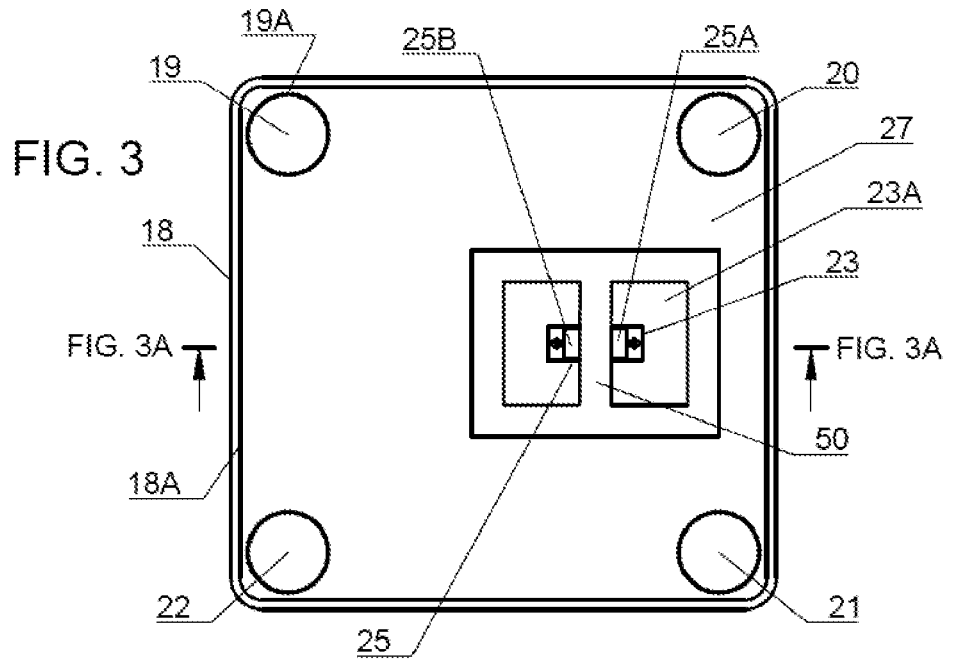
FIG. 3 is a top plan view of an interior layout of a housing of an indicator portion, open and exposed (without cover or lid, which is shown in FIG. 4)

FIG. 3 shows the top indicator housing 18 with permanently placed cylinder magnets 19, 20, 21 and 22 at the respective corners of indicator housing 18. It can be seen that indicator housing 18 cylinder magnet 19 is placed into housing depression 19A. Permanent cylinder magnets 19, 20, 21 and 22 are mounted so that their magnetic downward field polarity is attracted to their respective base trigger housing 1 cylinder magnets 6, 7, 8 and 9. Therefore, the indicator housing 18 cylinder magnet 19 is mated with and attracted to the trigger housing 1 cylinder magnet 6. The top indicator housing 18 cylinder magnet 20 is mated with and attracted to the trigger housing 1 cylinder magnet 7. The top indicator housing 18 cylinder magnet 21 is mated with and attracted to the base trigger housing 1 cylinder magnet 8. The indicator housing 18 cylinder magnet 22 is mated with and attracted to the base trigger housing 1 cylinder magnet 9. Indicator housing 18 has a surface 27 with one recessed channel slot 23. Channel slot 23 has a rectangular shaped magnet 25 in the channel slot logically divided into two equal magnet sections 25A and 25B, with the top surface of section 25A which may painted a distinguishing colour such as red and the other section 25B which may painted a distinguishing colour such as painted green.

By design of channel slot magnet 25 is free to travel in the channel slot ½ the length of the magnet either way. With the magnet 10 millimeters long, it can travel 5 millimeters in one direction and 5 millimeters in the other direction. Therefore, channel slot 23 is only 15 millimeters long. The magnetic field of magnet 25 in channel slot 23 has a vertical facing magnetic field that faces down towards the trigger end piece upwardly facing magnet 36 (within trigger housing) which effects the movement of magnet 25 within channel slot 23. As the magnet 25 moves one way or the other by 5 millimeters, the top of the magnet color, red or green is visible or obscured by covering or bar 50 (also shown in FIG. 3A) through clear window 51 as shown in FIG. 4. Such alert is located on a top surface 33 of lid 28 of indicator housing. Looking at FIG. 3, bar covering 50 covers the middle 5 mm section of channel 23 and therefore hides either 25A or 25 B, depending on the position of magnet 25. Bar covering 50 doesn't touch magnet 25, therefore allowing magnet 25 to freely move. It can be seen that the movement and magnetic coupling from upwardly facing magnet 36 will effect movement in top indictor magnet 25. Therefore, when upwardly facing magnet 36 moves in one direction, the indicator channel slot magnet, magnet 25 will follow the direction of movement. The aforementioned measurements are for illustration only.

Figure 3A:
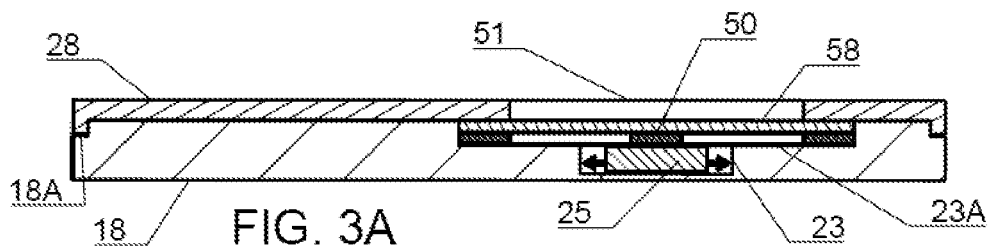
FIG. 3A is a cross section side view illustrating of the interior layout of a housing of an indicator portion (which is the area marked in FIG. 3)
Figure 4:
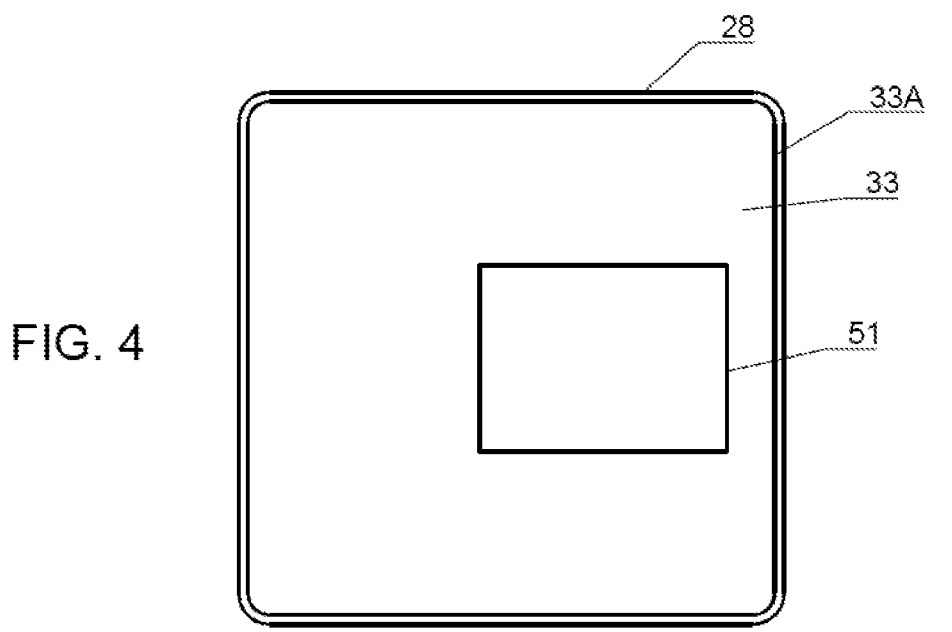
FIG. 4 is a plan view of an underside of the lid of the housing the indicator portion, shown in FIG. 3.

FIG. 3A shows a side view of the components with the indictor housing 18 and lid 28. Indicator window 51 is above depression 23A which holds glass 58, which is above bar covering 50 which is above magnet 25 within channel 23. Edge 18A is where the lid 28 mates with the base of the indicator housing 18.

FIGS. 8 and 9 are intended to illustrate trigger housing 1 without trigger end piece 34 in place (FIG. 8) and with trigger end piece 34 in place (FIG. 9). More specifically, permanent cylinder magnets 6, 7, 8 and 9 will mate with permanent cylinder magnets 19, 20, 21 and 22 on the indicator housing. Fixed magnet 2 is at end of channel 11. In FIG. 9, there has been "activation" of the trigger end piece 34, which is in situ within channel 11, such that forward facing magnet 35 is coupled with fixed magnet 2 (to which it is attracted), wicking portion 10A is separated from wicking portion 10B (i.e. a material change has occurred) which separation enabled forward facing magnet 35 on trigger end piece 34 to act upon its attraction to fixed magnet 2. Also shown is upwardly facing magnet 36 which would, in situ, act upon a magnetic field with the indicator housing, as described in detail herein.

(Refer to FIGS. 7, 7A, 7B, 7C, 7D) An alternative embodiment of a two channel version of the trigger housing, trigger housing lid, indicator housing, indicator housing lid and the trigger portion.

FIG. 7 is an isometric view containing the top indicator housing (two channel version) with visible parts of both wicking sensors and the trigger housing (two channel version);

FIG. 7A is an top plan view of an interior layout of a housing of a trigger portion (two channel version), open and exposed (without cover or lid, which is shown in FIG. 7B);

FIG. 7B is a plan view of an underside of a lid of a housing of a trigger portion (two channel version);

FIG. 7C is a top plan view of an interior layout of a housing of an indicator portion (two channel version), open and exposed (without cover or lid, which is shown in FIG. 7D);

FIG. 7D is a plan view of an underside of the lid of the housing the indicator portion (two channel version), shown in FIG. 7C;

Reference numerals 80 (see FIG. 7A) and 82 (see FIG. 7C) respectively refer to the left channel in the trigger housing and indictor housing. Reference numerals 81 (see FIG. 7A) and 83 (see FIG. 7C) respectively refer to the right channel in the trigger housing and indictor housing.

Mechanism of Triggering (Refer to FIGS. 5, 5B, 5F and 5G) When moisture enters wicking sensor section 10E and travels through wicking portions 10D and 10C (as shown in FIG. 5G enlargement), it reaches the overlap wicking portion 10B (as shown in FIG. 5F enlargement) where it dissolves the water dissolvable adhesive 10F as shown in FIG. 5F which is located at the overlapped seam between wicking portion 10B and 10A. When the adhesive 10F dissolves, the bond between wicking portions 10A and 10B breaks and allows the trigger end piece to move towards fixed magnet 2. When the bond 10F breaks, trigger end piece (specifically forward-facing magnet 35) is pulled towards base trigger housing magnet 2 and snaps the magnets 35 and 2 tight together (or to the wall between them). The magnetic field of upwardly facing magnet 36 influences and pulls the magnetic field in top indictor moveable magnet 25. When there are no leaks or wet wicking portion 10A, 10B, 10C, 10D and 10E, and the trigger end piece(s) 34 are aligned with a gap 2A between fixed magnet 2, and the trigger end piece forward facing magnet 35, the trigger end piece upward facing magnet 36 aligns the top indicator component magnet 25 with the magnets color green showing through indicator window 51 located on the face 33 on top indicator lid 28. (see FIGS. 3, 4 and 6A)

The position and alignment of the upwardly facing magnet 36 pulls the top indicator magnet 25 in channel slot 23 towards the back of the top indicator channel slot 23.

As shown in FIG. 6, the indicator housing 18 is placed over roof membrane 40, which is placed over the trigger housing 1 and lid 17 within coverboard 55. The shielded wicking portion 10D is carried down the insulation 39 to place the exposed wicking sensor 10E on a concrete deck 38 (or other type of deck as required).

FIG. 6A is an enlarged isometric view of the indicator portion, which is an exploded version of the specific area marked in FIG. 6. As noted herein, channel slot 23 houses a preferably rectangular shaped upper indicator magnet 25, wherein the channel slot is logically divided into two equal magnet sections 25A and 25B. These may be colour distinguished. For example, top surface of magnet section 25A which may be painted a distinguishing colour such as red and top surface of magnet section 25B may be painted a distinguishing colour such as green. FIG. 6A further shows bar covering 50, indicator window 51 and upper indicator magnet 25.

In one aspect, the wicking portion is covered, along all or part of its length, with a protective, waterproof covering or sheath 10D which functions to ensure only moisture that comes into contact with the wicking sensor 10E, is wicked along the wicking portion 10D to where it is exposed again at 10C and 10B. This way, there are no false readings due to moisture that comes into contact with the wicking portion 10D other than from the intended wicking sensor section 10E. Further, it is contemplated that the waterproof covering could also help to enhance the wicking efficiency of the wicking portion through a combination of capillary action and reduced evaporation of wicked moisture along wicking section 10D.

The wicking portions/sensor in sections 10A, 10B, 10C, 10D and 10E may be made up of different wicking materials, from poly vinyl alcohol, polyester fibers and/or polyester open cell material construction. A number of alternative and suitable substances, which may be used as the wicking material would be known to one skilled in the art, including open cell materials, fibers, microfibers, etc. The suitability of a material may be determined in part by its moisture transport qualities, including for example: (i) fiber type or open cell type of wicking material; (ii) construction, structure and combination of fibers and cells of wicking material; (iii) weight or thickness of the wicking material; and (iv) presence of chemical treatments in wicking material.

The wicking portions/sensor 10A, 10B, 10C, 10D and 10E can be made from organic or synthetic fibers and/or open cell materials, chemicals and inorganic or organic compounds, or combinations thereof. A number of suitable materials may be selected. The primary function of course is that the material be effective in wicking and transferring the moisture, once detected, along the length of the wicking portion. Other factors to consider may include one or more of the following: speed of wicking, durability, stability (visa-vis temperature changes etc.), microbe resistant, non-flammable, flame retardant, reversibility, etc.

As previously mentioned, to avoid false readings at wicking section 10D, (e.g. from moisture which comes a roof component not being tested), section 10D may be encased within a waterproof covering. The covering can be clear or opaque. Preferably the covering is made from a plastic or other material that is one or more of: flame-resistant, flame retardant, non-flammable, self-extinguishing, temperature resistant, water resistant and scuff and puncture resistant. Suitable materials for the covering on 10D include, but are limited to: PVC heat shrink tubing, PTFE (polytetraflour-ethylene) plastic heat shrink tubing; or PEEK (polyether ether ketone), a linear, semi-crystalline aromatic polymer plastic heat shrink tubing.

Additional Preferred Embodiments

The present invention provides a device for use in detecting and indicating moisture leaks which does not require puncturing or compromise of a building membrane comprises i) a wicking sensor ii) a wicking portion longitudinally or otherwise joined to the wicking sensor; iii) a nonelectronic trigger housing for placement, in use, below the building membrane, said nonelectronic trigger housing adapted for receiving a signal from the wicking portion in response to moisture from the wicking sensor; and iv) a non-electronic indicator housing for placement, in use, above the building membrane and in alignment with the trigger housing, said a non-electronic indicator housing adapted for receiving a non-electronic trigger signal from the trigger housing and to thereafter for producing a notification of a leak.

Preferably, the non-electronic trigger signal is at least one magnetic field coupling of two or more components within the trigger housing and the indicator housing. Preferably, the notification is achieved by coupling of two or more magnets (at least one below building membrane and at least one above the building membrane) which are otherwise separated until there is the non-electronic trigger signal from the trigger housing. Preferably, the trigger housing comprises a trigger end piece, setable when in use within a channel of the trigger housing, and which trigger end piece is removably attachable to one end of the wicking portion distal to the wicking sensor (the "trigger portion"). Preferably, the wicking portion is materially changeable in response to moisture from the wicking sensor (the "material change") and thereby forms a means to activate a trigger portion to couple a first magnetic field, within the trigger housing and a second magnetic field, within the indicator housing, said coupling then activating a moisture alert within the indicator housing. Preferably, the trigger end piece comprises a forwardly facing magnet which is attracted to, but spaced apart from, during device set up, a fixed magnet at an end the channel and an upwardly facing magnet attracted to a magnet within the indicator housing. Preferably, the material change is any physical disruption of the wicking portion including but not limited to: separation, severance, breakage, dissolution of a part, stretching, shrinking, swelling, raising, lowering vertical or horizontal or diagonal movement, pulling, pushing, or any combination thereof.

Preferably, magnetic field coupling is achieved by coupling of two or more magnets (one below building membrane and one above the building membrane) which are otherwise separated until there is a material change in at least one part of the wicking sensor. Preferably, the trigger housing comprises a trigger end piece, setable when in use within a channel of the trigger housing, and which trigger end piece is removably attachable to one end of the wicking portion distal to the wicking sensor (the "trigger portion") and wherein device comprises a forwardly facing magnet and an upwardly facing magnet on the trigger end piece, a fixed magnet at an end of the channel of the trigger base housing and at least one indicator housing magnet, which magnets are capable of movement including horizontal and vertical movement, rolling, sliding, turning, tilting, toggling, flipping, raising or lowering, rotating or any combination of the foregoing.

Preferably, the device of the invention is enabled by a material change in at least one part of the wicking sensor which moves a forwardly facing magnet disposed on a trigger end piece which is attracted to, but spaced apart from, during device set up, a fixed magnet at an end of a channel within the trigger housing and an upwardly facing magnet attracted to a magnet within the indicator housing, which magnets are capable of movement including horizontal and vertical movement, rolling, sliding, turning, tilting, toggling, flipping, raising or lowering, rotating or any combination of the foregoing. Preferably, the trigger housing comprises a trigger end piece, setable when in use within a channel of the trigger housing, and which trigger end piece is removably attachable to one end of the wicking portion distal to the wicking sensor (the "trigger portion") and wherein device additionally comprises a means to pull the trigger end piece in response to a material change in the wicking portion ("pulling means") such that there is delivery of the non-electronic trigger signal to the indicator to enable notification of a leak. Preferably, wherein the trigger housing comprises a trigger end piece, setable when in use within a channel of the trigger housing, and which trigger end piece is removably attachable to one end of the wicking portion distal to the wicking sensor (the "trigger portion") and wherein device additionally comprises a means to push the trigger end piece in response to a material change in the wicking portion ("pushing means") such that there is delivery of the non-electronic trigger signal to the indicator to enable notification of a leak. Preferably, wherein pulling means is any biasing means selected from the group consisting of elastic bands, wires, springs and other materials capable of producing a pulling force. Preferably, wherein the pushing means is any biasing materials selected from the group consisting of elastic bands, wires, springs, expanding material and other material capable of producing a pushing force. More preferably, wherein the pushing means is pushing means is any expanding material selected from the group consisting of compressed rubber, plastic foam and other compressed material and substances capable of producing a pushing force.

Preferably, the trigger housing comprises a trigger end piece, setable when in use within a channel of the trigger housing, and which trigger end piece is removably attachable to one end of the wicking portion distal to the wicking sensor (the "trigger portion") and wherein device additionally comprises one or more of:

i) a means to push the trigger end piece in response to a material change in the wicking portion ("push means");
ii) a means to pull the trigger end piece in response to a material change in the wicking portion ("pull means"); and
iii) means to create a magnetic field coupling of two or more components within the trigger housing and the indicator housing;

such that there is delivery of the non-electronic trigger signal to the indicator to enable notification of a leak.

Preferably, the indicator housing comprises at least one magnetic field sensing/indicating sheet or film. More preferably, the indicator housing comprises a magnetic field sensing ferrofluid.

Preferably, the non-electronic indicator housing comprising at least one rectangular magnet which receives the non-electronic trigger signal from the trigger housing and thereafter produced the notification of a leak. Preferably, the non-electronic indicator housing comprises a plurality of cylindrical magnets which are attracted to like cylindrical magnets within the trigger housing such that the non-electronic indicator housing and the trigger housing may be properly aligned when in use. Preferably, the non-electronic indicator housing comprises four cylindrical positioning magnets, one at each corner, wherein two are front cylindrical indicator housing positioning magnets and two are back cylindrical indicator housing positioning magnets and wherein the trigger housing also comprises four cylindrical positioning magnets, one at each corner, wherein two are front cylindrical trigger housing positioning magnets and two are back cylindrical trigger housing positioning magnets and wherein the back cylindrical trigger housing positional magnets and are of opposite polarity orientation to the front cylindrical indicator housing positional magnets to ensure that the indicator housing can only be positioned with one orientation relative to the trigger housing.

Preferably, the non-electronic indicator housing comprises four cylindrical positioning magnets, one at each corner, wherein two are front cylindrical indicator housing positioning magnets and two are back cylindrical indicator housing positioning magnets and wherein non-electronic indicator housing also comprises a indicator magnet which is movable upon receipt of the trigger signal from the trigger housing from an untriggered position (no moisture detection) to a triggered position (moisture detection), thereafter for producing a notification of a leak and wherein the two front cylindrical indicator housing positioning magnets are of the same polarity and orientation as the indicator magnet so that, until moisture detection and triggering, indicator magnet is held in place (cannot physically be pulled into a triggered position) by the two front cylindrical indicator housing positioning magnets.

Preferably, the trigger housing comprises a trigger end piece, setable when in use within a channel of the trigger housing, and which trigger end piece is removably attachable to one end of the wicking portion distal to the wicking sensor (the "trigger portion"), wherein trigger end piece comprises a forward facing magnet and an upwardly facing trigger housing coupling magnet, wherein channel of trigger housing comprises a fixed magnet which is attracted to the forward facing magnet, wherein the indicator housing comprises an indicator magnet which is movable upon receipt of the trigger signal from the trigger housing from an untriggered position (no moisture detection) to a triggered position (moisture detection), thereafter for producing a notification of a leak, wherein the upwardly facing trigger housing coupling magnet is purposely positioned, pulled substantially back from the indicator magnet, so that when the indicator housing is correctly positioned and adhered to the building membrane, directly over the trigger housing, a pull between the indicator magnet and the upwardly facing trigger housing coupling magnet is substantial and when there is a trigger of moisture detection, the forward facing magnet is slingshotted towards the fixed magnet and the upwardly facing trigger housing coupling magnet engages the indicator magnet and helps it overcome friction.

Preferably, the building membrane is a roof membrane. Preferably, the wicking sensor is moisture permeable and the wicking portion is not moisture permeable. Preferably, a means to produce the notification of a leak comprises at least one magnetic pop pin, part or other component to provide an alert in the non-electronic indicator housing. More preferably, a means to produce the notification of a leak comprises at least one magnetic pop up pin, part or other component to provide an alert in the non-electronic indicator housing, which pin, part or other component displaces a free-resistant liquid selected from the group comprising dark, coloured, white and opaque. More preferably, the means to produce the notification of a leak comprises a cylinder tube within the non-electronic indicator housing which is movement reactive (pulled up or pushed down) under the influence of the non-electronic trigger signal.

Preferably, the device of the invention additionally comprises, within the trigger housing, a magnetic field generating means that pushes up against a second same polarity magnet whose movement upwards provides an alert that he indicator housing is centered correctly over the trigger housing. Preferably, a means to produce the notification of a leak comprises opposing polarity magnets (upper magnet in indicator housing and lower magnet in trigger housing) which act in concert to either lower or raise the upper magnet thereby producing a visual alert of moisture.

The present invention provides a method of detecting and indicating moisture leaks which does not require puncturing or compromise of a building membrane which comprises a) detecting moisture at a wicking sensor;
b) wicking moisture from the wicking sensor to a wicking portion
c) effecting a material change in at least one part of the wicking portion as a consequence of the moisture, such change triggering engagement between a trigger portion and an indicator portion;
d) creating a detectable signal within the indicator portion in response to such engagement, such detectable signal being notice of moisture at the wicking sensor;

wherein trigger portion is adapted to be placed below the building membrane and is in functional engagement with the wicking portion and the wicking sensor and wherein indicator portion is adapted to be placed above the building membrane.

Preferably, within the method, the wicking sensor is moisture permeable and the wicking portion is not moisture permeable. Preferably, within the method, triggering engagement between a trigger portion and an indicator portion is achieved by coupling of two or more magnets (one below building membrane and one above the building membrane) which are otherwise separated until there is a material change in at least one part of the wicking sensor. Preferably, within the method, magnetic field coupling is achieved by coupling of two or more magnets (one below building membrane and one above the building membrane) which are otherwise separated until there is a material change in at least one part of the wicking sensor which moves at least one magnet relative to other magnet, such movement including horizontal and vertical movement, rolling, sliding, turning, tilting, toggling, flipping, raising or lowering, rotating or any combination of the foregoing. Preferably, within the method, a material change is any physical disruption of the wicking portion including but not limited to: separation, severance, breakage, dissolution of a part, stretching, shrinking, swelling, raising, lowering vertical or horizontal or diagonal movement, pulling, pushing, or any combination thereof.

The present invention further provides a method of detecting and indicating moisture leaks which does not require puncturing or compromise of a building membrane which comprises a) detecting moisture at a wicking sensor;
b) wicking moisture from the wicking sensor to one or more wicking portions;
c) effecting a material change in one wicking portion within a trigger end piece, as a consequence of the moisture, such change triggering engagement between a trigger portion within the trigger end piece and an indicator portion;
d) creating a detectable signal within the indicator portion in response to such engagement, such detectable signal being notice of moisture at the wicking sensor;

wherein the trigger portion within the trigger end piece is adapted to be placed below the building membrane and is in functional engagement with the wicking portion and the wicking sensor and wherein indicator portion is adapted to be placed above the building membrane.

Preferably, within the method, the triggering engagement between a trigger portion and an indicator portion is achieved by way of any means which pulls trigger end piece in response to a material change in the wicking portion ("pulling means"). Preferably, within the method, the triggering engagement between a trigger portion and an indicator portion is achieved by way of any means which pushes trigger end piece in response to a material change in the wicking portion ("pushing means"). Preferably, within the method, the pulling means is any biasing means selected from the group consisting of elastic bands, wires, and springs and other material capable of producing a pulling force. Preferably, within the method, the pushing means is any biasing materials selected from the group consisting of elastic bands, wires, springs, and expanding material and other material capable of producing a pushing force. More preferably, within the method, the pushing means is any expanding material selected from the group consisting of compressed rubber or plastic foam and other compressed material and substances capable of producing a pushing force.

Preferably, within the device and method of the invention, the magnets are of a shape selected from the group consisting of round, rectangular, cylindrical, and square, although other shapes are contemplated for use and the invention as a whole should not be limited in this means. Preferably, within the device and method of the invention there is provided a bayonet sensor that collapses in length and inserts in a hole that user drills or cuts out.

Preferably, the device of the invention additionally comprises a radio/Wi-Fi/data signal transmitter to convey notification of the leak/moisture. It is preferred that the device additionally comprises a means to convey an alert via an internet gateway for viewing (by a user) on one or more of a mobile application, a web platform or for data storage (for example, in the Cloud/private server/public sever).

III Alternative Embodiments

It is to be understood that, outside of the core aspects of the invention, a number of device and method variants are available and selectable.

Different Designs of Various Wicking Materials, Covering and Indicator Materials 1. Moisture wicking materials: Alternatively the moisture wicking material or substance can be made from organic or inorganic material, but preferably from inorganic material that will not rot. This material may be, for example, polyvinyl alcohol, fiberglass, polyester, polypropylene, or other synthetic or inorganic material or composite designs.
2. Alternative to allow different shapes for the capillary tube covering: Alternatively, the wicking portion 10D can be provided with a covering that is flat, round, square, rectangular, octagonal or hexagonal in shape or any other possible shape preferred.
3. Alternative moisture wicking construction length: Alternatively, each of the wicking portion/sensor 10D or 10E can be constructed as long in length as preferred to be trimmed in length by the end user.
4. Constructing with additional tape: Constructing with additional tape: Alternatively, adhesive tape can be added to the bottom of wicking portion 10D to adhere the capillary tube to a roof component.
5. Constructing with stiffening material: Alternatively, add a stiffening material inside the 10D wicking portion (and adhered to 10E), to aid the moisture wicking portion in holding a shape. The material could possibly be aluminum, carbon fiber, fiberglass, flame resistant, or non-flammable, or self-extinguishing material such as plastic, or other material.

Installation Near Different Roof Top Projections and Details

1. The invention can be used near roof pipe jacks or stacks, intake or exhaust roof vents, roof anchors, multi-flash boxes, electrical retro boxes, roof breather vents, prefabricated curbs, steel curbs for HVAC units, hatches, walls, parapets, control joints, skylights, fan curbs, spun copper drains, aluminum drains, cast iron drains, drain sumps, scuppers and other roof top equipment. Alternately, the roof sensor can be installed away from RTU in the "field" area of the roof. The roof sensor can also be installed on its side in roof walls and roof parapets, effectively above the roof surface.

Allowing Design for Flame, Mold and Fungus and Moisture Protection

1. Alternatively, add a flame resistant material or substance to the wicking material.
2. Alternatively, add a flame resistant material or substance to the unit casing housings.
3. Alternatively, add a mold resistant material or substance to the wicking material.
4. Alternatively, add a fungus resistant material or substance to the wicking material.
5. Alternatively, add a substance or chemical to keep the wicked moisture from freezing.

The indictor window 51 as shown in FIG. 4 and, is preferred be designed to protect from U.V. radiation, oxidation, wind erosion, rain erosion, thermal damage and contact damage with careful choice of materials and design. The channel holding magnet may be sealed with upper gaskets and filled with, for example, Argon or Kryton gas to prevent condensation in the channel during cold weather.

Alternate Design, Components of Trigger Housing and Method of Use Thereof:

1. As an alternative, magnet 2 and 35 may be replaced with an elastic type of band, wire or spring that pulls trigger end piece 34 and with its wicking material 10A in response to a material change in the wicking portion.
2. As a further alternative, magnets 2 and 35 could be replaced with a spring or expanding material (such as, for example, compressed rubber or plastic foam) that pushes the trigger end piece 34 and with its wicking material 10A in response to a material change in the wicking portion.
3. As a further alternative, there is provided a combination of the foregoing, namely the provision of means to apply pressure to push or pull the trigger end piece and/or wicking portion, towards the end of the channel/slot in the trigger housing thereby activating a magnetic coupling in the trigger housing which moves the magnet or ferromagnetic material in the indicator unit.

While the forms of device, method and systems described herein constitute preferred embodiments of this invention, it is to be understood that the invention is not limited to these precise forms. As will be apparent to those skilled in the art, the various embodiments described above can be combined to provide further embodiments. Aspects of the present device, method and systems (including specific components thereof) can be modified, if necessary, to best employ the concepts of the invention. These aspects are considered fully within the scope of the invention as claimed. For example, the various methods described above may omit some acts, include other acts, and/or execute acts in a different order than set out in the illustrated embodiments. Preferred aspects of the device are optional and may not go to the core of the invention.

These and other changes can be made to the present device, systems, and methods in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

LEGEND

1 Trigger Housing (aka Trigger Base Housing)
2 Fixed Magnet
4 Port/Opening
6-9 Permanent Cylinder Magnets on Trigger Housing
9A Base housing depression into which Permanent Cylinder magnet 9 is placed
10A Wicking Sensor point of attachment to Water Dissolving Adhesive
10B Wicking Portion
10C Wicking Portion
10D Wicking Portion (closest to Wicking Sensor)
10E Wicking Sensor
10F Water Dissolving Adhesive
11 Chamber Slot/Channel with Trigger Housing
17 Base Lid
18 Indicator Housing
18A Edge 18A (where the lid 28 mates with the base of the indicator housing 18)
19-22 Permanent Cylinder Magnets on Indicator Housing
19A Indicator Housing Depression into which cylinder magnet 19 is placed
23A Depression with holds Glass 58
25 Indicator Magnets (divided as 25A and 25B)
27 Surface of Indicator Housing
28 Lid of Indicator Housing
33 Top Surface of Lid 28
34 Trigger End Piece
34A Section of Trigger End Piece 34 where the plastic has been removed
35 Forward Facing Magnet
36 Upwardly Facing Magnet (aka tray coupling magnet)
37 Upper Surface of Trigger End Piece aka Upper Flat Surface
38 Concrete Deck
39 Insulation
40 Roof Membrane
42 Entire Moisture Detection System
43A Removable Term Bar
43B Base Sensor Housing Section
44 General Area of Moisture Wicking Portion
46 General Area of Trigger System
50 Bar Covering
51 Indicator Window
53A/53B Term Bar Fastening Nuts
53C/53D Hexagon shaped Holes in Underside of Trigger Housing
55 Coverboard
57 Stiffening Material
58 Glass
80 Left Channel (in two-channel Trigger Housing)
81 Right Channel (in two-channel Trigger Housing)
82 Left Channel (in two-channel Indicator Housing)
83 Right Channel (in two-channel Indicator Housing)

We claim:

1. A device for use in detecting and indicating moisture leaks in a building membrane comprises:
   i) a wicking sensor;
   ii) a wicking portion joined to the wicking sensor;
   iii) a non-electronic trigger comprising at least one magnet positioned below the building membrane, said non-electronic trigger configured to receive a signal from the wicking portion in response to moisture detected from the wicking sensor; and
   iv) a non-electronic indicator comprising at least one magnet positioned above the building membrane and in alignment with the non-electronic trigger, wherein said non-electronic indicator is configured to receive a non-electronic magnetic field coupling from the non-electronic trigger and to thereafter for producing a notification of a leak, wherein the non-electronic magnetic field coupling is achieved by coupling of said at least one magnet of the non-electronic trigger and said at least one magnet of the non-electronic indicator, when there is a material change in at least one part of the wicking sensor.

2. The device of claim 1 wherein the notification is achieved by coupling of said at least one magnet of the non-electronic trigger and said at least one magnet of the non-electronic indicator, which are otherwise separated until the non-electronic trigger magnetic field coupling from the non-electronic trigger is received by said non-electronic indicator.

3. The device of claim 1 wherein the non-electronic trigger comprises a trigger end piece, set within a channel of a trigger housing, and which trigger end piece is removably attachable to one end of the wicking portion distal to the wicking sensor.

4. The device of claim 1, wherein the non-electronic trigger comprises a trigger end piece, set within a channel of a trigger housing, and which trigger end piece is removably attachable to one end of the wicking portion distal to the wicking sensor and wherein said at least one magnet of the non-electronic trigger is capable of movement including horizontal and vertical movement, rolling, sliding, turning, tilting, toggling, flipping, raising or lowering, rotating or any combination of the foregoing.

5. The device of claim 1, wherein the non-electronic trigger comprises a trigger end piece, set within a channel of a trigger housing, and which trigger end piece is removably attachable to one end of the wicking portion distal to the wicking sensor and wherein device additionally comprises a means to pull or push the trigger end piece in response to a material change in the wicking portion such that there is delivery of the non-electronic magnetic field coupling to the indicator to enable notification of a leak.

6. The device of claim 1 wherein the non-electronic trigger comprises a trigger end piece, set within a channel of a trigger housing, and which trigger end piece is removably attachable to one end of the wicking portion distal to the wicking sensor and wherein device additionally comprises one or more of:
   i) a means to push the trigger end piece in response to a material change in the wicking portion;
   ii) a means to pull the trigger end piece in response to a material change in the wicking portion; and
   (iii) means to create a magnetic field coupling of two or more components within a trigger housing and an indicator housing, such that there is delivery of the non-electronic magnetic field coupling to the indicator to enable notification of a leak.

7. The device of claim 1 wherein the non-electronic indicator comprises at least one magnetic field sensing/indicating sheet or film or a magnetic field sensing ferrofluid.

8. The device of claim 1 wherein the non-electronic indicator is within an indicator housing comprises a plurality of cylindrical magnets which are attracted to opposing cylindrical magnets within a trigger housing for the non-electronic trigger such that the indicator housing and the trigger housing may be properly aligned when in use.

9. A method of detecting and indicating moisture leaks which does not require puncturing or compromise of a building membrane, which method comprises:
   a) detecting moisture at a wicking sensor;
   b) wicking moisture from the wicking sensor to a wicking portion;
   c) effecting a material change in at least one part of the wicking portion as a consequence of the moisture, said material change triggering a magnetic field coupling between a magnet of the non-electronic trigger portion and a magnet of the non-electronic indicator portion; and
   d) creating a detectable signal within the non-electronic indicator portion in response to said triggering, said detectable signal being notice of moisture at the wicking sensor, wherein said trigger portion is placed below the building membrane and is in functional engagement with the wicking portion and the wicking sensor, and wherein said indicator portion is placed above the building membrane.

10. The method of claim 9 wherein the wicking sensor is moisture permeable and the wicking portion is not moisture permeable.

11. The method of claim 9 wherein said magnetic field coupling is achieved by coupling of said magnets, which are otherwise separated until said material change in at least one part of the wicking sensor which moves at least one magnet relative to other magnet, such movement including horizontal and vertical movement, rolling, sliding, turning, tilting, toggling, flipping, raising or lowering, rotating or any combination of the foregoing.

12. The method of claim 9 wherein material change is any physical disruption of the wicking portion including but not limited to: separation, severance, breakage, dissolution of a part, stretching, shrinking, swelling, raising, lowering vertical or horizontal or diagonal movement, pulling, pushing, or any combination thereof.

* * * * *